(12) United States Patent
Kobayashi

(10) Patent No.: US 9,548,013 B2
(45) Date of Patent: *Jan. 17, 2017

(54) IMAGE DISPLAY DEVICE AND DRIVE METHOD THEREFOR

(71) Applicant: Sharp Kabushiki Kaisha, Osaka-shi, Osaka (JP)

(72) Inventor: Masamitsu Kobayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

This patent is subject to a terminal disclaimer.

(21) Appl. No.: 14/433,229

(22) PCT Filed: Sep. 27, 2013

(86) PCT No.: PCT/JP2013/076238
§ 371 (c)(1),
(2) Date: Apr. 2, 2015

(87) PCT Pub. No.: WO2014/054522
PCT Pub. Date: Apr. 10, 2014

(65) Prior Publication Data
US 2015/0262520 A1    Sep. 17, 2015

(30) Foreign Application Priority Data

Oct. 5, 2012  (JP) ................................ 2012-223587

(51) Int. Cl.
*G09G 5/00*    (2006.01)
*G09G 3/00*    (2006.01)
(Continued)

(52) U.S. Cl.
CPC ............. *G09G 3/003* (2013.01); *G02F 1/1334* (2013.01); *G02F 1/13476* (2013.01);
(Continued)

(58) Field of Classification Search
CPC ........ G09G 3/36; G09G 3/003; G09G 3/2022; G09G 3/3413; G09G 3/20; G09G 3/2003; G09G 2310/0235; G09G 2320/0261; G09G 2300/023
(Continued)

(56) References Cited

U.S. PATENT DOCUMENTS 7,764,334 B2 *  7/2010  Kitagawa ............. G02B 6/0068
                                                    349/65
8,878,757 B2 * 11/2014  Yoshida ............... G09G 3/3406
                                                    345/84
(Continued)

FOREIGN PATENT DOCUMENTS

JP    H6-43478 A     2/1994
JP    H10-254425 A   9/1998
(Continued)

OTHER PUBLICATIONS

International Search Report PCT/ISA/210 for International Application No. PCT/JP2013/076238 dated Mar. 27, 2013.

*Primary Examiner* — Vijay Shankar
(74) *Attorney, Agent, or Firm* — Harness, Dickey & Pierce, P.L.C.

(57) ABSTRACT

An embodiment of the present invention provides an image display device capable of performing transmittance of a background and black display, while relaxing restriction of an installation position of a light source unit.
The image display device includes a CF liquid crystal panel, a PDLC panel, and a first PDLC light source unit. The PDLC panel is positioned on the rear surface of the CF liquid crystal panel. At an image displaying time, the PDLC panel becomes in a spreading state. At this time, light source light of the first PDLC light source unit is spread by the PDLC panel and is emitted to the CF liquid crystal panel, and background light is spread by the PDLC panel. At an image
(Continued)

non-displaying time, the PDLC panel becomes in a transmittance state. At this time, the background light is transmitted through the PDLC panel, and reaches the CF liquid crystal panel.

17 Claims, 18 Drawing Sheets

(51) Int. Cl.
G02F 1/1334 (2006.01)
G09G 3/36 (2006.01)
G02F 1/1347 (2006.01)
G09G 3/34 (2006.01)
G09G 3/20 (2006.01)

(52) U.S. Cl.
CPC ......... *G09G 3/2003* (2013.01); *G09G 3/3413* (2013.01); *G09G 3/36* (2013.01); *G09G 3/2022* (2013.01); *G09G 2300/023* (2013.01); *G09G 2300/0404* (2013.01); *G09G 2310/0235* (2013.01); *G09G 2320/0261* (2013.01); *G09G 2340/10* (2013.01)

(58) Field of Classification Search
USPC ........................................ 345/1.1–5, 204–215
See application file for complete search history.

(56) References Cited

U.S. PATENT DOCUMENTS

| 2006/0139289 A1 | 6/2006 | Yoshida et al. |
| 2008/0030650 A1 | 2/2008 | Kitagawa et al. |
| 2008/0068359 A1 | 3/2008 | Yoshida et al. |

FOREIGN PATENT DOCUMENTS

| JP | 200183498 A | 3/2001 |
| JP | 2001-184034 A | 7/2001 |
| JP | 2004-198961 A | 7/2004 |
| JP | 2005-160759 A | 6/2005 |
| JP | 2005-275184 A | 10/2005 |
| JP | 2006106614 A | 4/2006 |
| JP | 2008-34372 A | 2/2008 |
| JP | 2008070838 A | 3/2008 |
| JP | 2008-176148 A | 7/2008 |
| JP | 2012-177770 A | 9/2012 |
| JP | 05191726 B2 | 5/2013 |

* cited by examiner

IMAGE DISPLAY DEVICE AND DRIVE METHOD THEREFOR

CROSS REFERENCE TO RELATED APPLICATIONS

This is a National Phase Application of PCT/JP2013/0076238 filed Sep. 27, 2013, which is an International Application claiming priority to JP Application No. 2012-223587 filed on Oct. 5, 2012, the entire contents of which are hereby incorporated by reference.

TECHNICAL FIELD

The present invention relates to an image display device, and particularly, relates to an image display device capable of transmitting a background, and a drive method for the image display device.

BACKGROUND ART

In recent years, there have been progressed developments of an image display device capable of transmitting a background as well as performing image display. For example, in Japanese Patent Application Laid-Open No. H5-191726, there is disclosed a presence display device that performs display by merging an image in a background. FIG. 30 is a view showing a configuration of a presence display device 200 disclosed in Japanese Patent Application Laid-Open No. H5-191726. As shown in FIG. 30, the presence display device 200 includes a projector 201, a transmission factor control screen 202, an image extracting device 203, and an image-outline forming device 204. The image extracting device 203 extracts an image to be displayed. The projector 201 projects the extracted image to the transmission factor control screen 202. The image-outline forming device 204 extracts outline information of the image to be displayed, and controls a state of the transmission factor control screen 202, based on the outline information. The transmission factor control screen 202 is specifically a PDLC (Polymer Dispersed Liquid Crystal) panel. The transmission factor control screen 202 is controlled such that only a region in which projection light from the projector 201 is applied becomes in a state of spreading light (hereinafter, referred to as a "spreading state"), and that other regions become in a state of allowing light to be transmitted (hereinafter, referred to as a "transmittance state"). With this configuration, the presence display device 200 can display, to an observer 205, the image to be displayed, by merging the image into the background including an ornamental tree 206 and a wall picture 207, for example.

PRIOR ART DOCUMENTS

Patent Documents

[Patent Document 1] Japanese Patent Application Laid-Open No. H5-191726
[Patent Document 2] Japanese Patent Application Laid-Open No. 2008-34372
[Patent Document 3] Japanese Patent Application Laid-Open No. 2006-106614

SUMMARY OF THE INVENTION

Problems to be Solved by the Invention

The PDLC panel can spread light or allow light to be transmitted, but cannot shield the light. Therefore, in the presence display device 200 in which only the PDLC panel is used as the panel (a screen) contributing to image display, black display cannot be performed. Further, in the presence display device 200, the projector 201 not only functions as a light source unit, but also forms an image itself. Accordingly, in the presence display device 200, in order to appropriately set a focal distance of light applied by the projector 201 and the like, an installation position of the projector 201 is restricted to a relatively narrow range.

Therefore, an object of the present invention is to provide an image display device capable of performing transmittance of a background and black display, while relaxing restriction of an installation position of a light source unit, and a drive method for the image display device.

Means for Solving the Problems

A first aspect of the present invention is directed to an image display device that displays a color image, comprising:
a first display panel comprising a plurality of first display elements arranged in a matrix shape, and capable of transmitting incident light as color light; and
a light irradiating unit that applies light to the first display panel, wherein the light irradiating unit comprises:
a light source unit; and
a second display panel capable of switching between a spreading state of spreading incident light and a transmittance state of allowing incident light to be transmitted,
the second display panel becomes in the spreading state at a time when the color image is to be displayed, to spread light emitted by the light source unit, and
the first display panel displays the color image by controlling a transmission factor of light spread by the second display panel,
wherein the second display panel comprises a plurality of second display elements each capable of switching between the spreading state and the transmittance state.

According to a second aspect of the present invention, in the first aspect of the present invention,
the light source unit comprises a first second-display panel light source unit that applies light to the second display panel.

According to a third aspect of the present invention, in the second aspect of the present invention,
the first second-display panel light source unit applies light to one main surface of the second display panel.

According to a fourth aspect of the present invention, in the third aspect of the present invention,
the light source unit further comprises a second second-display panel light source unit that applies light to the second display panel, and
the first second-display panel light source unit and the second second-display panel light source unit apply light to both main surfaces of the second display panel, respectively.

According to a fifth aspect of the present invention, in the second aspect of the present invention,
the first second-display panel light source unit has directivity at a level at which light can be applied to a part of the second display panel.

According to a sixth aspect of the present invention, in the first aspect of the present invention,
the light irradiating unit further comprises a first light guide plate that guides incident light, and
the light source unit comprises a light-guide plate light source unit that applies light to the first light guide plate.

According to a seventh aspect of the present invention, in the sixth aspect of the present invention, from a side of the first display panel, the first light guide plate and the second display panel are sequentially arranged.

According to an eighth aspect of the present invention, in the sixth aspect of the present invention, from a side of the first display panel, the second display panel and the first light guide plate are sequentially arranged.

According to a ninth aspect of the present invention, in the sixth aspect of the present invention, the light irradiating unit further comprises a second light guide plate that guides incident light, the light-guide plate light source unit applies light to the first light guide plate and the second light guide plate, and from a side of the first display panel, the first light guide plate, the second display panel, and the second light guide plate are sequentially arranged.

According to a tenth aspect of the present invention, in the sixth aspect of the present invention, the first light guide plate is formed into a plurality of blocks, and the light-guide plate light source unit applies light to each block.

According to a twelfth aspect of the present invention, in the eleventh aspect of the present invention, each of the second display elements corresponds to any of the plurality of first display elements, and becomes in a spreading state synchronously with a corresponding first display element, at a time when the color image is to be displayed.

According to a thirteenth aspect of the present invention, in the first aspect of the present invention, the image display device comprises a first display drive unit that drives the first display panel;

a second display drive unit that drives the second display panel;

a light source drive unit that drives the light source unit; and a signal processing unit that controls the first display drive unit, the second display drive unit, and the light source drive unit, respectively, based on an input signal given from an outside.

According to a fourteenth aspect of the present invention, in the thirteenth aspect of the present invention, the signal processing unit comprises:

an image control unit that generates first display data for controlling the first display drive unit, second display data for controlling the second display drive unit, and light source data for controlling the light source drive unit, based on image data for displaying the color image and display-image position assigning data for assigning a display position of the color image, each of which is obtained based on the input signal;

a first display control unit that controls the first display drive unit based on the first display data;

a second display control unit that controls the second display drive unit based on the second display data; and a light source control unit that controls the light source drive unit based on the light source data.

According to a fifteenth aspect of the present invention, in the fourteenth aspect of the present invention, the input signal comprises the image data and the display-image position assigning data, and the signal processing unit further comprises a signal separation control unit that separates the input signal into the image data and the display-image position assigning data, and that gives the image data and the display-image position assigning data to the image control unit.

According to a sixteenth aspect of the present invention, in the fourteenth aspect of the present invention, the input signal comprises the image data, and the signal processing unit further comprises a display-image position detecting unit that generates the display-image position assigning data based on the image data which the input signal comprises, and that gives the image data and the display-image position assigning data to the image control unit.

According to a seventeenth aspect of the present invention, in the thirteenth aspect of the present invention, the signal processing unit separates one frame period of the input signal into a plurality of sub-frame periods, and interpolates, in the sub-frame periods, images to be displayed in each of continuous frame periods.

An eighteenth aspect of the present invention is directed to a drive method for an image display device comprising a first display panel comprising a plurality of first display elements arranged in a matrix shape and capable of transmitting incident light as color light, and a light irradiating unit applying light to the first display panel and also comprising a second display panel, and displaying a color image, the drive method comprising:

a step of switching a state of the second display panel between a spreading state of spreading incident light and a transmittance state of allowing incident light to be transmitted; and a step of making the color image displayed in the first display panel by controlling a transmission factor of light spread by the second display panel, wherein the light irradiating unit further comprises a light source unit, and the step of switching the state of the second display panel comprises a step of switching the state of the second display panel to the spreading state at a time when the color image is to be displayed, and spreading light emitted by the light source unit, wherein the second display panel comprises a plurality of second display elements each capable of switching between the spreading state and the transmittance state.

Effects of the Invention

According to the first aspect of the present invention, in the image display device that displays a color image, the second display panel in the spreading state spreads the light emitted by the light source unit, and the first display panel controls the transmission factor of the spreading light, so that image display is performed. Therefore, by shielding the spreading light by the first display panel, black display can be performed. The image to be displayed is formed by not the light source unit, but by the first display panel. Therefore, restriction of the installation position of the light source unit (the projector in Japanese Patent Application Laid-Open No. H5-191726) can be relaxed. Further, when the second display panel is in the transmittance state, background light can be transmitted. It should be noted that because the first display panel capable of transmitting the incident light as color light is employed, a configuration required for driving can be simplified, as compared with the case of displaying a color image by the field sequential system.

According to the second aspect of the present invention, image display can be performed, by applying light from the first second-display panel light source unit to the second display panel, and by controlling the transmission factor of the spreading light by the first display panel.

According to the third aspect of the present invention, by applying light to one main surface of the second display panel, effects similar to those in the second aspect of the present invention can be obtained.

According to the fourth aspect of the present invention, because light is applied to both main surfaces of the second display panel, luminance of the display image can be improved.

According to the fifth aspect of the present invention, it is possible to arrange such that light is applied to a part that is set to the spreading state, and light is not applied to a part that is set to the transmittance state in the second display panel. Therefore, it is possible to appropriately mix in one screen a part where image display is performed and a part where background transmittance is performed.

According to the sixth aspect of the present invention, the light emitted by the light-guide plate light source unit is applied to the second display panel via the first light guide plate. The first display panel controls the transmission factor of the spreading light, so that image display is performed. In the case of using the first second-display panel light source unit, the light-guide plate light source unit, and the first light guide plate, luminance of display image can be improved. In the case of using the first and second second-display panel light source units, the light-guide plate light source unit, and the first light guide plate, luminance of display image can be more improved.

According to the seventh aspect of the present invention, from a side of the first display panel, by sequentially arranging the first light guide plate and the second display panel, effects similar to those in the sixth aspect of the present invention can be obtained.

According to the eighth aspect of the present invention, from a side of the first display panel, by sequentially arranging the second display panel and the first light guide plate, effects similar to those in the sixth aspect of the present invention can be obtained.

According to the ninth aspect of the present invention, by sequentially arranging the first light guide plate, the second display panel, and the second light guide plate, effects similar to those in the sixth aspect of the present invention can be obtained. Further, the light emitted from each of the first and second light guide plates is spread by the second display panel, and is applied to the first display panel. Accordingly, luminance of the display image can be improved.

According to the tenth aspect of the present invention, because the first light guide plate formed into blocks is used, it is possible to arrange such that light is applied to a part that is set to the spreading state, and light is not applied to a part that is set to the transmittance state in the second display panel. Therefore, it is possible to appropriately mix in one screen a part where image display is performed and a part where background transmittance is performed.

According to the eleventh aspect of the present invention, the second display panel includes a plurality of second display elements, and each second display element can be switched between the spreading state and the transmittance state. Therefore, in accordance with the display position of the image, a part to be set to the spreading state and a part to be set to the transmittance state can be set in the second display panel. Accordingly, image display and background transmittance can be performed simultaneously.

According to the twelfth aspect of the present invention, because the second display element is set to the spreading state synchronously with the first display element, a part to be set to the spreading state and a part to be set to the transmittance state in the second display panel are set following the image displayed in the first display panel. Therefore, in the video display and the like, spreading light from the second display panel is securely applied in the first display panel. Accordingly, picture quality at a video displaying time and the like can be improved.

According to the thirteenth aspect of the present invention, by using the signal processing unit, and the first display drive unit, the second display drive unit, and the light source drive unit that are controlled by the signal processing unit, it is possible to securely drive the first display panel, the second display panel, and the light source unit.

According to the fourteenth aspect of the present invention, by using the signal processing unit including the image control unit, the first display control unit, the second display control unit, and the light source control unit, it is possible to securely perform the drive for performing image display.

According to the fifteenth aspect of the present invention, because the display-image position assigning data is included in the input signal, it is possible to securely reflect a display position of the image intended in the generation origin of the input signal.

According to the sixteenth aspect of the present invention, because the display-image position assigning data is generated by the display-image position detecting unit, a display position of the image can be set in real time or at a predetermined position, for example.

According to the seventeenth aspect of the present invention, because frame interpolation is performed by using a sub-frame period, smooth video display can be performed.

According to the eighteenth aspect of the present invention, in the drive method for an image display device, effects similar to those in the first aspect of the present invention can be obtained.

MODES FOR CARRYING OUT THE INVENTION

Hereinafter, first to third embodiments of the present invention will be described with reference to the appended drawings.

1. First Embodiment

1.1 Overall Configuration

Figure 1:
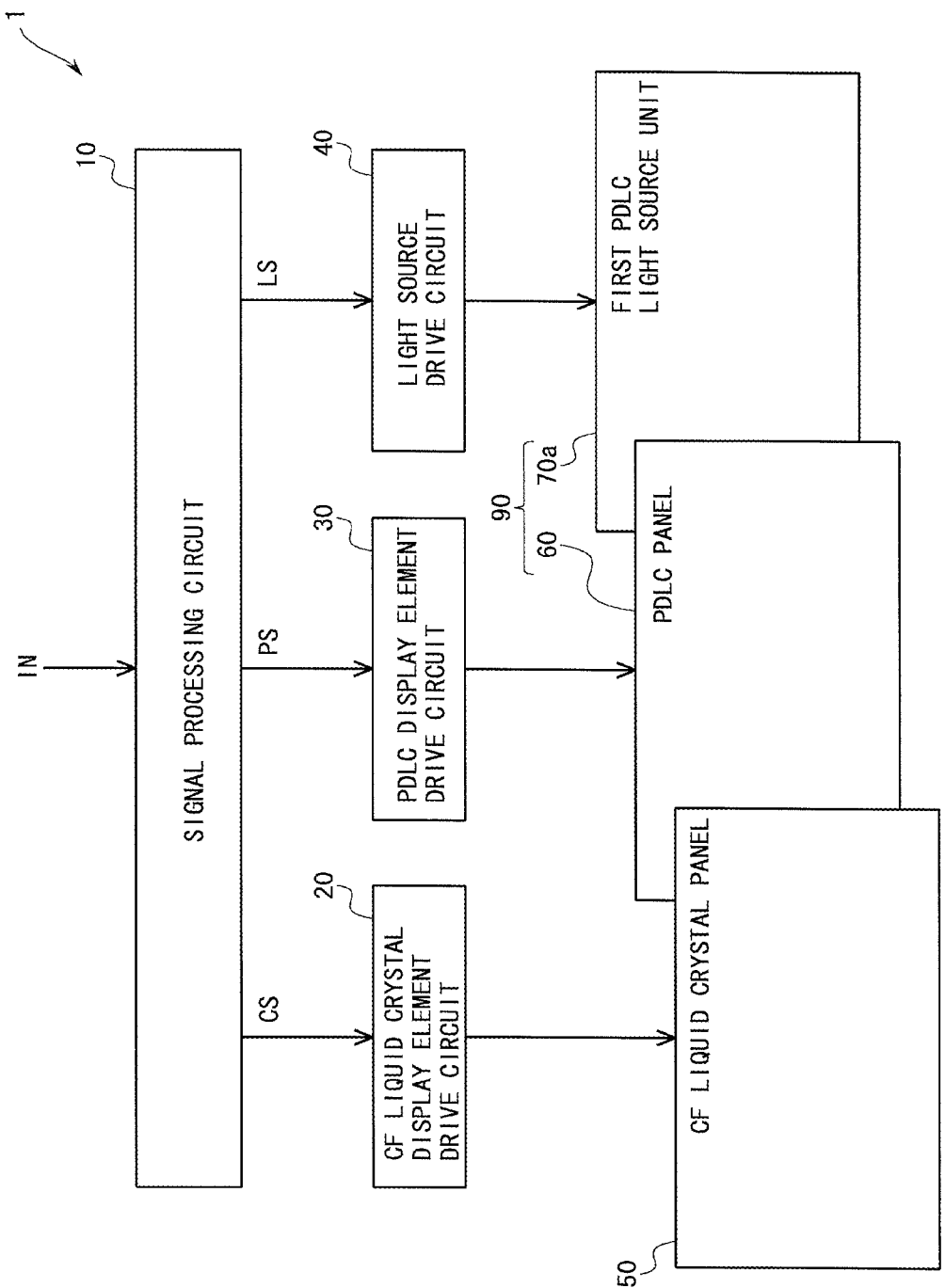
FIG. 1 is a block diagram showing a configuration of an image display device according to a first embodiment of the present invention.

FIG. 1 is a block diagram showing a configuration of an image display device 1 according to a first embodiment of the present invention. It should be noted that, in the following, a color filter will be abbreviated as "CF". The image display device 1 includes a signal processing circuit 10, a CF liquid crystal display element drive circuit 20, a PDLC display element drive circuit 30, a light source drive circuit 40, a liquid crystal panel having a CF (hereinafter, referred to as a "CF liquid crystal panel") 50, a PDLC panel 60, and a first PDLC light source unit 70a. In the present embodiment, the CF liquid crystal display element drive circuit 20 corresponds to a first display drive unit, the PDLC display element drive circuit 30 corresponds to a second display drive unit, the CF liquid crystal panel 50 corresponds to a first display panel, the PDLC panel 60 corresponds to a second display panel, and the first PDLC light source unit 70a corresponds to a first second-display panel light source unit. In the present embodiment, the PDLC panel 60 and the first PDLC light source unit 70a constitute a light irradiating unit 90. In the present embodiment, the first PDLC light source unit 70a constitutes the light source unit 100.

The signal processing circuit 10 receives an input signal IN from the outside, and controls the CF liquid crystal display element drive circuit 20, the PDLC display element drive circuit 30, and the light source drive circuit 40, based on the input signal IN. More specifically, the signal processing circuit 10 gives a CF liquid crystal display element signal CS for controlling the CF liquid crystal display element drive circuit 20 to the CF liquid crystal display element drive circuit 20, gives a PDLC display element signal PS for controlling the PDLC display element drive circuit 30 to the PDLC display element drive circuit 30, and gives a light source signal LS for controlling the light source drive circuit 40 to the light source drive circuit 40.

The CF liquid crystal display element drive circuit drives the CF liquid crystal panel 50, based on the received CF liquid crystal display element signal CS. The PDLC display element drive circuit 30 drives the PDLC panel 60, based on the received PDLC display element signal PS. The light source drive circuit 40 drives the first PDLC light source unit 70a, based on the received light source signal LS.

Figure 2:
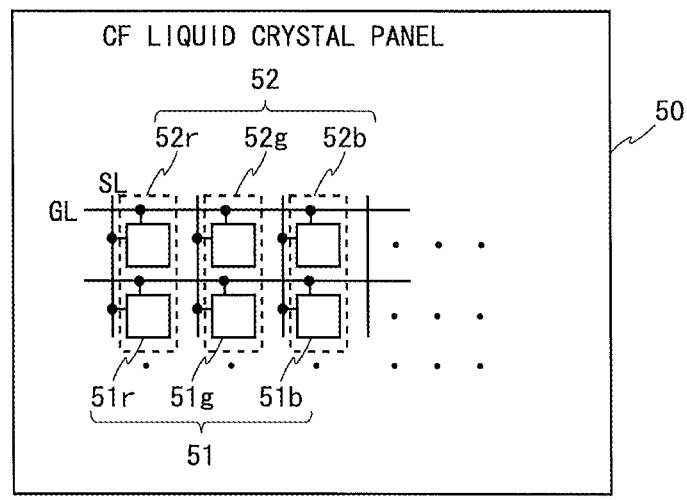
FIG. 2 is a view showing a configuration of a CF liquid crystal panel shown in FIG. 1.

FIG. 2 is a view showing a configuration of the CF liquid crystal panel 50 shown in FIG. 1. The CF liquid crystal panel 50 includes a plurality of signal lines SL, a plurality of scanning lines GL, and a plurality of CF liquid crystal display elements 51 arranged in a matrix shape in accordance with the intersection of the plurality of signal lines SL and the plurality of scanning lines GL, and a CF 52 provided on the CF liquid crystal display element 51. More specifically, the CF liquid crystal display element 51 includes an R sub-pixel CF liquid crystal display element 51a for forming a sub-pixel of a red color (R) (hereinafter, referred to as an "R sub-pixel"), a G sub-pixel CF liquid crystal display element 51g for forming a sub-pixel of a green color (G) (hereinafter, referred to as a "G sub-pixel"), and a B sub-pixel CF liquid crystal display element 51b for forming a sub-pixel of a blue color (B) (hereinafter, referred to as a "B sub-pixel"). It should be noted that a sub-pixel CF liquid crystal display element for forming a sub-pixel of other color such as cyan (C), magenta (M), and yellow (Y) may be also used. More specifically, the CF 52 includes an RCF 52r for transmitting incident light as red color light (color light), a GCF 52g for transmitting incident light as green color light (color light), and a BCF 52b for transmitting incident light as blue color light (color light). It should be noted that, in the case where the color of a sub-pixel is other than RGB, the CF 52 includes a CF for transmitting the incident light as light of the color of the sub-pixel. The CF liquid crystal panel 50 controls a transmission factor of each of the CF liquid crystal display elements 51 (more specifically, the R sub-pixel CF liquid crystal display element 51a, the G sub-pixel CF liquid crystal display element 51g, and the B sub-pixel CF liquid crystal display element 51b) by being driven by the CF liquid crystal display element drive circuit 20. In the present embodiment, by controlling the transmission factor of each of the CF liquid crystal display elements 51 (more specifically, the R sub-pixel CF liquid crystal display element 51a, the G sub-pixel CF liquid crystal display element 51g, and the B sub-pixel CF liquid crystal display element 51b), color image display and black display is possible. It should be noted that the CF liquid crystal panel 50 according to the present embodiment may be any of a normally black system and a normally white system. In the present embodiment, the CF liquid crystal display element 51 corresponds to a first display element.

In the CF liquid crystal panel 50, for the purpose of increasing a transmission factor and the like, the CF 52 in a pixel (a sub-pixel) may be in a partly damaged state, or a pixel (a sub-pixel) having no CF 52 may exist. Concerning such a mode like this, for example, there are a pixel structure including sub-pixels of RGBW, and a structure in which a pixel having the CF 52 exists in only a part of the entire screen.

Figure 3:
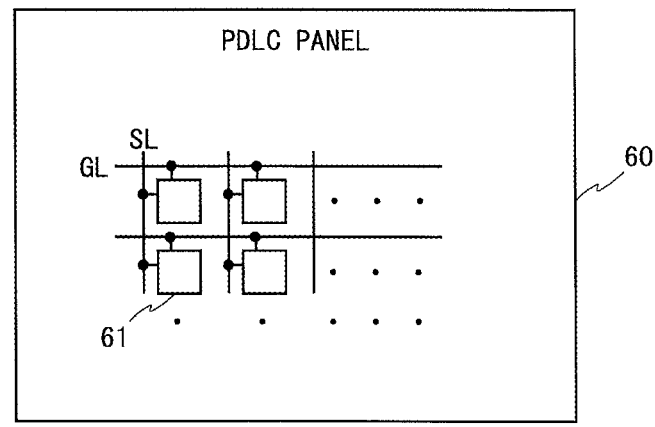
FIG. 3 is a view showing a configuration of a PDLC panel shown in FIG. 1.

FIG. 3 is a view showing a configuration of the PDLC panel 60 shown in FIG. 1. The PDLC panel 60 includes a plurality of signal lines SL, a plurality of scanning lines GL, and a plurality of PDLC display elements 61 arranged in a matrix shape in accordance with the intersection of the plurality of signal lines SL and the plurality of scanning lines GL. Each of the PDLC display elements 61 corresponds to any of the plurality of CF liquid crystal display elements 51. It should be noted that the number of the PDLC display elements 61 (the number of pixels of the PDLC panel 60) is not necessarily required to be coincident with the number of the CF liquid crystal display elements 51 (the number of pixels of the CF liquid crystal panel 50). The PDLC panel 60 includes a PDLC layer. The PDLC layer becomes in the spreading state of spreading incident light when a voltage is not applied, and becomes in the transmittance state of transmitting incident light when a voltage is applied. It should be noted that the PDLC layer may become in the transmittance state when a voltage is not applied and become in the spreading state when a voltage is applied. The state of the PDLC layer can be controlled in a PDLC display element 61 unit. In the present specification, for convenience of description, the sate of the PDLC layer is also described as the state of the PDLC panel 60 or the state of the PDLC display element 61. The PDLC panel 60 controls the state of the PDLC display element 61 by being driven by the PDLC display element drive circuit 30. In the present embodiment, the PDLC display element 61 corresponds to a second display element.

The PDLC panel 60 may be set switchable to an intermediate state of spreading and also transmitting incident light, in addition to the spreading state and the transmittance state. In other words, the PDLC panel 60 may be set switchable to the spreading state with a relatively large spreading rate, the transmittance state with a relatively small spreading rate, and the intermediate state where the spreading rate is an intermediate value between a value in the spreading state and a value in the transmittance state. In the present specification, the "spreading rate" is a value expressing a level of spreading the incident light, and when the value becomes larger, the level of spreading becomes large. The spreading rate of the PDLC panel 60 is controlled by the application voltage. For example, the larger the application voltage is, the smaller the spreading rate of the PDLC panel 60 becomes. Further, the larger the application voltage is, the larger the spreading rate of the PDLC panel 60 may become. It should be noted that there may be a plurality of kinds of the intermediate state. Utilization of the intermediate state of the PDLC panel 60 will be described later.

Figure 4:
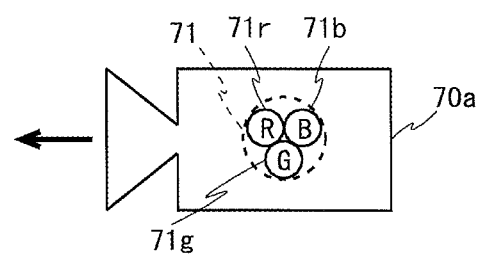
FIG. 4 is a view showing a configuration of the PDLC light source unit shown in FIG. 1.

FIG. 4 is a view showing a configuration of the first PDLC light source unit 70a shown in FIG. 1. The first PDLC light source unit 70a includes a plurality of light sources 71 each including one light emitting element 71r, one light emitting element 71g, and one light emitting element 71b that have a red color, a green color, and a blue color, respectively. The arrangement of the plurality of light sources 71 is not particularly limited. Each of the light emitting elements is, for example, an LED, a CCFL, or a laser light source, or an inorganic/organic EL (Electro Luminescence) light source. The configuration may be such that the first PDLC light source unit 70a includes devices such as a DMD and an LCOS, and a lens and a color wheel added to various light emitting elements, like a projector. It is desirable that the first PDLC light source unit 70a has directivity at a level at which the light can be applied to a part of the PDLC panel 60. However, the first PDLC light source unit 70a may not have such directivity. Each of the light sources 71 can control light intensity. For example, controlling a turn on state/a turn off state can be performed. The first PDLC light source unit 70a emits light source light of a white color by turning on the light emitting element 71r, the light emitting element 71g, and the light emitting element 71b that have a red color, a green color, and a blue color, respectively.

The light source 71 is not limited to include one light emitting element 71r, one light emitting element 71g, and one light emitting element 71b that have a red color, a green color, and a blue color, respectively. There is a case where the light source 71 includes one or a plurality of light emitting elements having a white color. Further, for example, there are a case where the light source 71 includes two light emitting elements 71r having a red color, two light emitting elements 71g having a green color, and one light emitting element 71b having a blue color, and a case where the light source 71 includes one light emitting element 71r having a red color, two light emitting elements 71g having a green color, and one light emitting element 71b having a blue color. The number of the light sources 71 is not limited to plural and may be one.

The CF liquid crystal panel 50 displays a color image by controlling a transmission factor of light (white color light) applied from the light irradiating unit 90 including the PDLC panel 60 and the first PDLC light source unit 70a. It should be noted that detailed description concerning the application of light toward the CF liquid crystal panel 50 will be made later.

1.2 Signal Control Circuit

Figure 5:
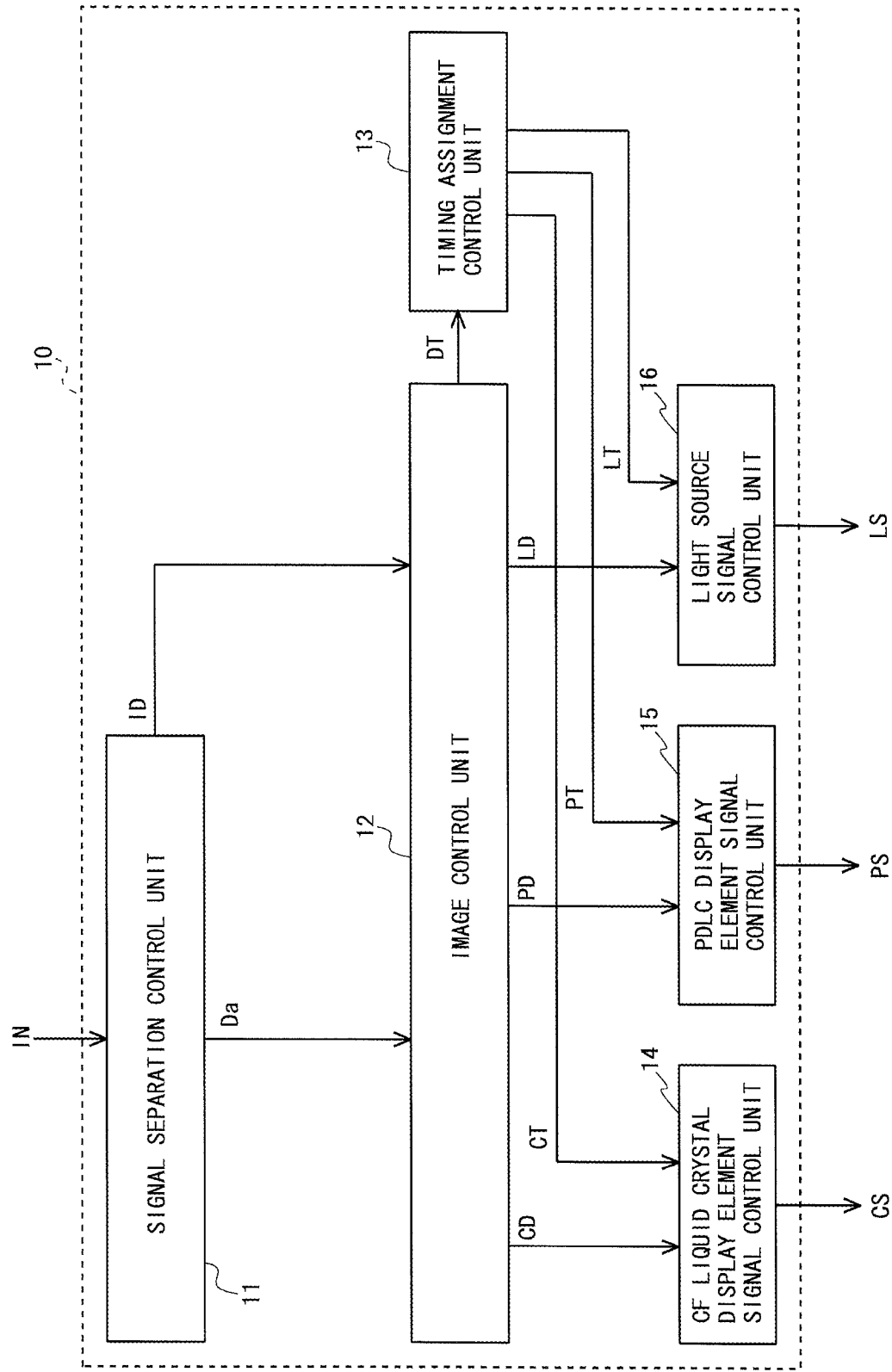
FIG. 5 is a block diagram showing a configuration of a signal processing circuit shown in FIG. 1.

FIG. 5 is a block diagram showing a configuration of the signal processing circuit 10 shown in FIG. 1. The signal processing circuit 10 includes a signal separation control unit 11, an image control unit 12, a timing assignment control unit 13, a CF liquid crystal display element signal control unit 14, a PDLC display element signal control unit 15, and a light source signal control unit 16.

The input signal IN according to the present embodiment includes display-image position assigning data Da for assigning a display position of an image to be displayed, and an image data ID indicating an image to be displayed. The signal separation control unit 11 receives the input signal IN, and separates the input signal IN into display-image position assigning data Da and an image data ID. The signal separation control unit 11 gives the display-image position assigning data Da and the image data ID to the image control unit 12. It should be noted that the image control unit 12 may have functions similar to those of the signal separation control unit 11. The image data ID includes data according to the number of separation of the area (hereinafter, referred to as a "separation area") in which the state is independently controlled in the PDLC panel 60, and spreading of light from each separation area. In the following, the area of the CF liquid crystal panel 50 corresponding to (more specifically, opposing) the separation area of the PDLC panel 60 will be also referred to as a "separation area".

Based on the display-image position assigning data Da and the image data ID, the image control unit 12 generates CF liquid crystal data CD for controlling the CF liquid crystal display element signal control unit 14, PDLC data PD for controlling the PDLC display element signal control unit 15, light source data LD for controlling the light source signal control unit 16, and drive timing control signal DT for adjusting a timing by synchronizing respective output signals of the CF liquid crystal display element signal control unit 14, the PDLC display element signal control unit 15, and the light source signal control unit 16. It should be noted that, in other words, the drive timing control signal DT is a signal for controlling an operation start time of each of the CF liquid crystal panel 50, the PDLC panel 60, and the first PDLC light source unit 70a (hereinafter, referred to as "each module") so as to be able to synchronize each module. The image control unit 12 gives the drive timing control signal DT, the CF liquid crystal data CD, the PDLC data PD, and the light source data LD to the timing assignment control unit 13, the CF liquid crystal display element signal control unit 14, the PDLC display element signal control unit 15, and the light source signal control unit 16, respectively. It should be noted that a detailed configuration of the image control unit 12 will be described later.

The timing assignment control unit 13 receives the drive timing control signal DT generated by the image control unit 12, and generates a CF liquid crystal timing assignment signal CT for assigning a drive timing of each of the CF liquid crystal display elements 51, a PDLC timing assignment signal PT for assigning a drive timing of each of the PDLC display elements 61, and a light source timing assignment signal LT for assigning a drive timing of each of the light sources 71, based on the drive timing control signal DT. At the time of generating the CF liquid crystal timing assignment signal CT, the PDLC timing assignment signal PT, and the light source timing assignment signal LT, the timing assignment control unit 13 can use a memory not shown provided at the outside of the timing assignment control unit 13 or a register. The timing assignment control unit 13 gives the CF liquid crystal timing assignment signal CT, the PDLC timing assignment signal PT, and the light source timing assignment signal LT that have been generated, to the CF liquid crystal display element signal control unit 14, the PDLC display element signal control unit 15, and the light source signal control unit 16, respectively.

The CF liquid crystal display element signal control unit 14 generates a CF liquid crystal display element signal CS based on the CF liquid crystal data CD and the CF liquid crystal timing assignment signal CT that have been received, and gives the CF liquid crystal display element signal CS to the CF liquid crystal display element drive circuit 20.

Based on the PDLC data PD and the PDLC timing assignment signal PT that have been received, the PDLC display element signal control unit 15 generates the PDLC display element signal PS, and gives the PDLC display element signal PS to the PDLC display element drive circuit 30.

Based on the light source data LD and the light source timing assignment signal LT that have been received, the light source signal control unit 16 generates the light source signal LS, and gives the light source signal LS to the light source drive circuit 40.

1.3 Image Control Unit

Figure 6:
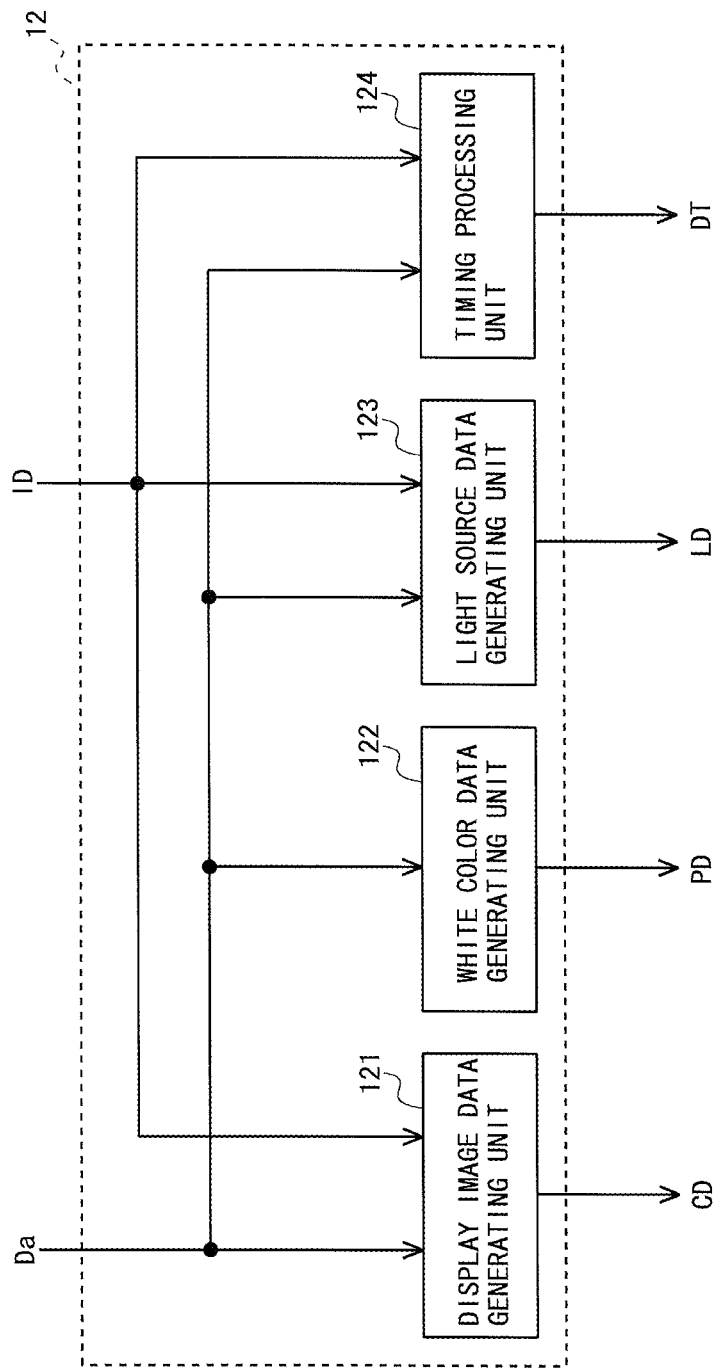
FIG. 6 is a block diagram showing a configuration of an image control unit shown in FIG. 5.

FIG. 6 is a block diagram showing a configuration of the image control unit 12 shown in FIG. 5. The image control unit 12 includes a display image data generating unit 121, a white color data generating unit 122, a light source data generating unit 123, and a timing processing unit 124.

The display image data generating unit 121 receives the display-image position assigning data Da and the image data ID, and generates, based on the received data, the CF liquid crystal data CD as display image data corresponding to the display image. The CF liquid crystal display element signal control unit 14 can set a transmission factor of each of the CF liquid crystal display elements 51 in the CF liquid crystal panel 50, based on the CF liquid crystal data CD.

The white color data generating unit 122 receives the display-image position assigning data Da, and based on the received data, generates the PDLC data PD as white color data in order to set a part or a whole of the PDLC panel 60 in a white color (the spreading state). The PDLC display element signal control unit 15 can set the state of the PDLC panel 60, according to the position of the display image, based on the PDLC data PD. More specifically, at the position in accordance with the display image, the PDLC panel 60 becomes in the spreading state. However, the state may be set uniformly in the whole PDLC panel 60. In this case, it is not necessary to give the display-image position assigning data Da to the white color data generating unit 122. Further, it is not necessary to give the PDLC timing assignment signal PT to the PDLC display element signal control unit 15.

The light source data generating unit 123 receives the display-image position assigning data Da and the image data ID, and generates the light source data LD, based on the received data. The light source signal control unit 16 can set lighting time of the light emitting element of each color and the like, based on the light source data LD. In the case where the first PDLC light source unit 70a has directivity of a level at which light can be applied to a part of the PDLC panel 60, the light source signal control unit 16 controls the light source drive circuit 40 such that the first PDLC light source unit 70a individually applies the light source light to each separation area of the PDLC panel 60. Further, the light source signal control unit 16 may assign the light emitting element to be lit according to the position of the display image, based on the light source data LD. It should be noted that, when the light source signal control unit 16 does not need to assign the light emitting element to be lit according to the position of the display image, the display-image position assigning data Da does not need to be given to the light source data generating unit 123.

The timing processing unit 124 receives the display-image position assigning data Da and the image data ID, and generates the drive timing control signal DT, based on the received data. More specifically, the timing processing unit 124 generates the drive timing control signal DT based on a desired relationship between the start time of the scan drive of the CF liquid crystal panel 50 and the PDLC panel 60 and the lighting start time of the light emitting element, the start time of the scan drive and the lighting start time being obtained from the display-image position assigning data Da and the image data ID.

1.4 Arrangement of Panel and Light Source Unit

Figure 7:
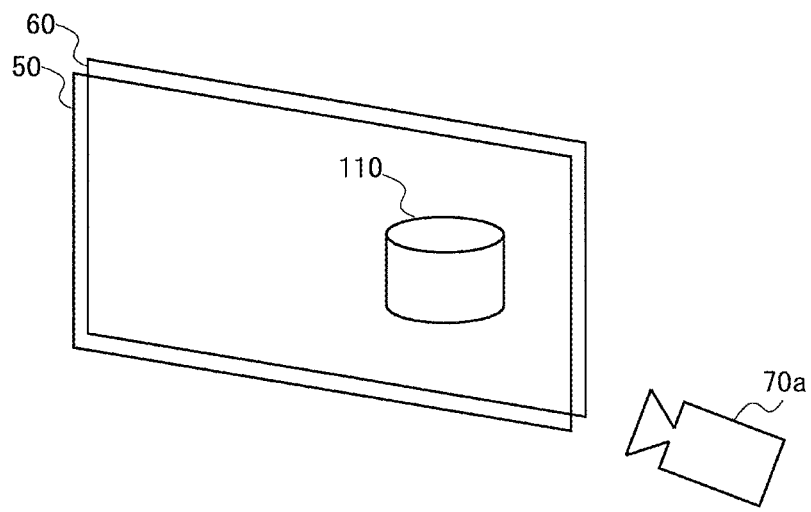
FIG. 7 is an oblique perspective view for explaining the arrangement of the CF liquid crystal panel, the PDLC panel, and the PDLC light source unit according to the first embodiment.

FIG. 7 is an oblique perspective view for explaining the arrangement of the CF liquid crystal panel 50, the PDLC panel 60, and the first PDLC light source unit 70a according to the present embodiment. A front side of the paper surface of FIG. 7 will be referred to as a front surface (a surface of the side where the observer is positioned), and the reverse side will be referred to as a rear surface (this will be similarly applied to the oblique perspective view described later). As shown in FIG. 7, the PDLC panel 60 is arranged on the rear surface of the CF liquid crystal panel 50. The CF liquid crystal display element 51 to which the PDLC display element 61 corresponds is, specifically, the CF liquid crystal display element 51 to which the PDLC display element 61 opposes. It should be noted that the first PDLC light source unit 70a may be positioned at any of the upper end side (the upper side of the paper surface), the lower end side (the lower side of the paper surface), the left end side (the left side of the paper surface), and the right end side (the right side of the paper surface) of the CF liquid crystal panel 50 and the PDLC panel 60, or may be positioned at a plurality of or all end surfaces. Further, as shown in FIG. 7, a display item 110, for example, is arranged at the rear surface side of the PDLC panel 60. However, it should be noted that arranging the display item 110 like this is not essential in the present invention.

Figure 8:
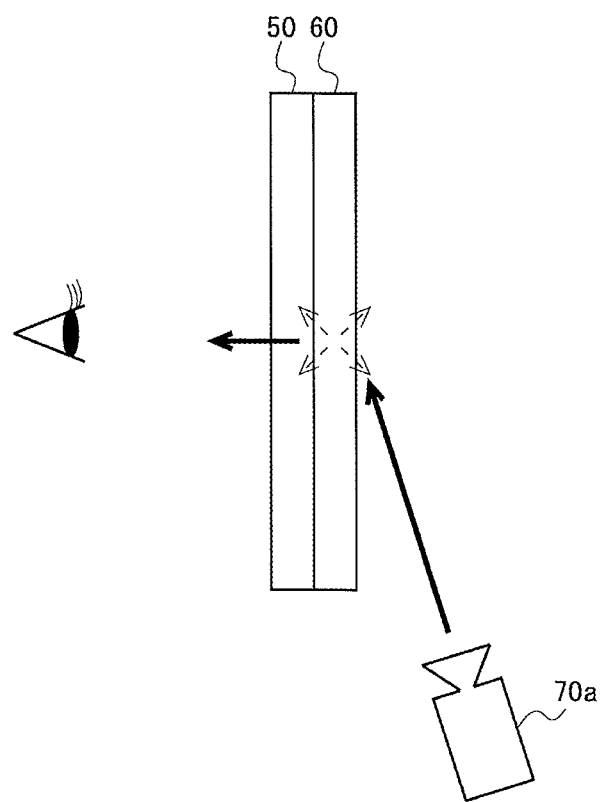
FIG. 8 is a sectional view of one pixel component of the CF liquid crystal panel and the PDLC panel shown in FIG. 7.

FIG. 8 is a sectional view of one pixel component of the CF liquid crystal panel 50 and the PDLC panel 60 shown in FIG. 7. It should be noted that the one pixel component in this case is one pixel component based on the CF liquid crystal panel 50 (the CF liquid crystal display element 51). The number of pixels of the CF liquid crystal panel 50 and the number of pixels of the PDLC panel 60 are not necessarily required to be coincident with each other. Further, an air layer and the like may be provided between the CF liquid crystal panel 50 and the PDLC panel 60. In FIG. 8, the left side of the paper surface is a front surface, and the right side of the paper surface is a rear surface (this will be similarly applied to the sectional view described later). In the following description, the one pixel shown in FIG. 8 will be also referred to as a "focused pixel" for convenience of description. The first PDLC light source unit 70a according to the present embodiment applies the light source light to the rear surface of the PDLC panel 60 (one main surface).

First, a case where the focused pixel constitutes an image (image displaying time) will be described. In this case, a voltage is not applied to the PDLC display element 61, and the PDLC display element 61 is in the spreading state. At this time, the first PDLC light source unit 70a applies the light source light to the separation area of the PDLC panel 60 including the focused pixel (hereinafter, referred to as a "focused separation area". It should be noted that the separation area of the CF liquid crystal panel 50 including the focused pixel is also similarly referred to as a "focused separation area"). Therefore, the light source light incident on the PDLC display element 61 is spread. An approximately vertical component facing the CF liquid crystal display element 51 (hereinafter, referred to as a "front direction vertical component") out of the spread light source light is emitted to the CF liquid crystal display element 51. On the PDLC display element 61, light from the rear surface of the PDLC display element 61 (the image display device 1), that is, light indicating the background including the display item 110 (hereinafter, referred to as "background light") is also incident. As described above, because the PDLC display element 61 is in the spreading state, the background light incident on the PDLC display element 61 is spread, and the front direction vertical component of the spread background light is emitted to the CF liquid crystal display element 51.

In this way, at the image displaying time, the light irradiating unit 90 including the PDLC panel 60 and the first PDLC light source unit 70a irradiates the CF liquid crystal panel 50 (the CF liquid crystal display element 51) with the light including the front direction vertical component of the spread light source light and background light. At the image displaying time, because the PDLC panel 60 spreads the background light, the background light that reaches the CF liquid crystal panel 50 is only the spread front direction vertical component. Therefore, the influence of the background light given to the display image is sufficiently suppressed.

Next, a case where the focused pixel does not constitute an image (image non-displaying time) will be described. There are two kinds of cases where the image is non-displayed: a case where the image is non-displayed in a whole surface of the CF liquid crystal panel 50 (hereinafter, referred to as a "whole surface non-displaying time"); and a case where the focused pixel does not constitute the image but there are other pixels that constitute the image (hereinafter referred to as a "partially non-displaying time"). Out of the whole surface non-displaying time and the partially non-displaying time, the whole surface non-displaying time will be first described. In the present embodiment, it is assumed that, in a portion that does not display the image, the CF liquid crystal display element 51 has been set in a relatively high transmission factor in order to be able to transmit the background. When it is desired to transmit the background more clearly, color concentration of the CF 52 may be set low within a range in which the color image can be displayed. It should be noted that, when it is not necessary to transmit the background, in the portion that does not display the image, the transmission factor of the CF liquid crystal display element 51 may be set in a relatively low value (that is, black display). Moreover, in the portion that does not display the image, the PDLC display element 61 my be set to the spreading state or the intermediate state. Accordingly, the level of the transmittance of the background can be adjusted, and the background may be allowed to be slightly transmitted, for example. Further, in the portion that displays the image, by setting the PDLC display element 61 in the intermediate state, the background may be allowed to be slightly transmitted within a range where the picture quality is not dropped. In this way, in the case of utilizing the intermediate state of the PDLC display element 61 (the PDLC panel 60), various display can be performed.

At the whole surface non-displaying time, a voltage is applied to the PDLC display element 61, and the PDLC display element 61 is in the transmittance state. Further, light source light is not applied from the first PDLC light source unit 70*a* to any separation area of the PDLC panel 60. Therefore, to the CF liquid crystal display element 51, only the background light that has transmitted through the PDLC display element 61 is applied. Accordingly, the background is transmitted.

At the partially non-displaying time, the PDLC display element 61 is in the transmittance state in a similar manner to that at the whole surface non-displaying time. On the other hand, unlike at the whole surface non-displaying time, the light source light is not emitted from the first PDLC light source unit 70*a* to the focused separation area, and the light source light from the first PDLC light source unit 70*a* is emitted to other separation areas. In this way, to the CF liquid crystal display element 51 of the separation area in which image display is not performed, the background light which has been transmitted through the PDLC display element 61 is applied. To the CF liquid crystal display element 51 of the separation area in which image display is performed, light including the front direction vertical component of the spread light source light and the background light is emitted. Therefore, it is possible to simultaneously perform image display and background transmittance, and also appropriately mix in one screen a part where image display is performed and a part where background transmittance is performed. However, in the case where the first PDLC light source unit 70*a* does not have directivity at a level at which light can be applied to a part of the PDLC panel 60, applying light for each separation area is not performed, but the light source light is applied to the whole surface of the PDLC panel 60, for example.

1.5 Operation

Figure 9:
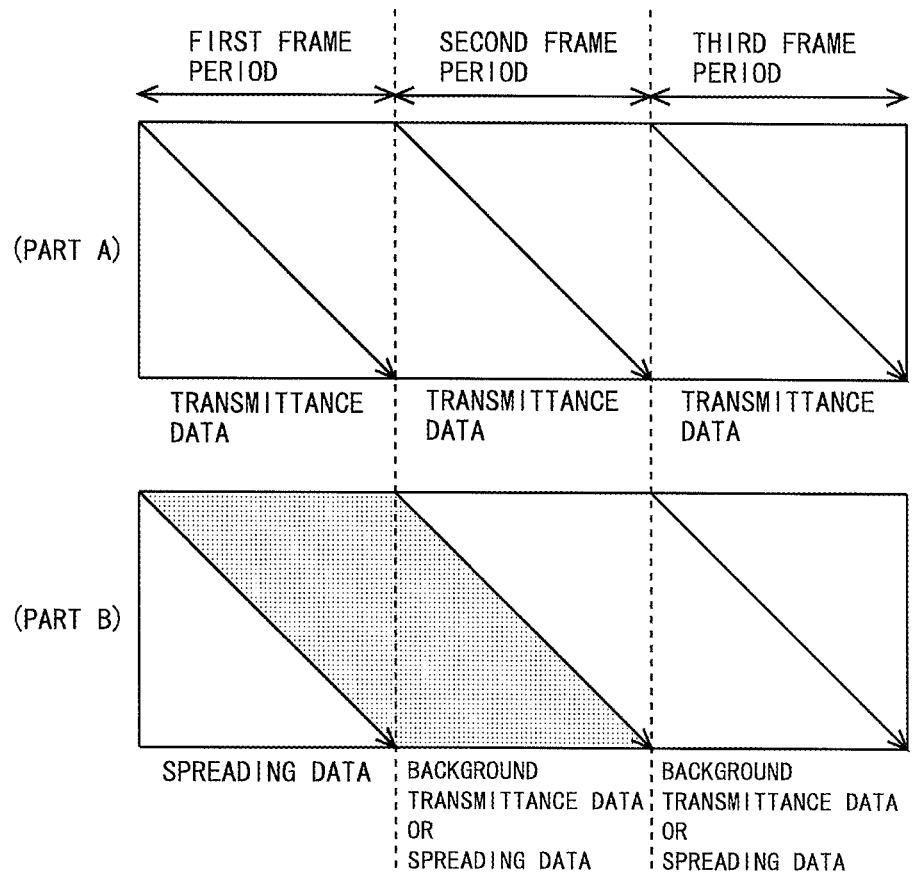
FIG. 9 is a view for explaining the operation of displaying the image according to the first embodiment. It should be noted that a part A shows scan drive of the CF liquid crystal panel, and a part B shows a timing of giving white color data to the PDLC panel.

FIG. 9 is a view for explaining the operation of displaying an image in the present embodiment. The part A in FIG. 9 shows scan drive of the CF liquid crystal panel 50, and the part B in FIG. 9 shows a timing of giving white color data to the PDLC panel 60. There are two kinds of white color data to be given to the PDLC panel 60. One is the spreading data that makes the PDLC panel 60 in the spreading state, and the other is the background transmittance data that makes the PDLC panel 60 in the transmittance state. In the following, data in which a transmittance amount of light of each color becomes not less than a constant value (a value of a level in which the image is visually confirmed) will be referred to as "transmittance data", and data in which a transmittance amount of light of each color becomes minimum will be referred to as "shield data". In this case, for convenience of description, it is assumed that the image is displayed in the first frame period, and the image is not displayed in the second frame period and the third frame period.

In the first frame period, as shown in the part A in FIG. 9, from the start time, scan drive of the CF liquid crystal panel 50 is performed from the upper end of the screen toward the lower end of the screen, and transmittance data is sequentially given to each pixel. Moreover, as shown in the part B in FIG. 9, from the start time of the first frame period, scan drive of the PDLC panel 60 is performed from the upper end of the screen toward the lower end of the screen synchronously with the CF liquid crystal panel 50, and spreading data is sequentially given to each pixel as white color data.

In the second frame period, as shown in the part A in FIG. 9, from the start time, scan drive of the CF liquid crystal panel 50 is performed from the upper end of the screen toward the lower end of the screen, and transmittance data is sequentially given to each pixel. Moreover, as shown in the part B in FIG. 9, from the start time of the second frame period, scan drive of the PDLC panel 60 is performed from the upper end of the screen toward the lower end of the screen synchronously with the CF liquid crystal panel 50, and background transmittance data is sequentially given to each pixel as white color data.

In the third frame period, as shown in the part A in FIG. 9, from the start time, scan drive of the CF liquid crystal panel 50 is performed from the upper end of the screen toward the lower end of the screen, and transmittance data is sequentially given to each pixel. Moreover, as shown in the part B in FIG. 9, from the start time of the third frame period, scan drive of the PDLC panel 60 is performed from the upper end of the screen toward the lower end of the screen synchronously with the CF liquid crystal panel 50, and background transmittance data is sequentially given to each pixel as white color data.

In this way, white color display can be appropriately performed in the first frame period, and the background can be transmitted in the second and third frame periods. In the case of performing color display, this kind of drive is applied in each color sub-pixel in the pixel.

It should be noted that the first PDLC light source unit 70*a* applies the light source light to the PDLC panel in the first frame period in which image display is performed, and does not apply the light source light to the PDLC panel 60 in the second frame period and the third frame period in which image display is not performed. It should be noted that, in the case where background transmittance is not necessary when image display is not performed, spreading data in place of background transmittance data may be given to the PDLC panel 60, in the second frame period and the third frame period.

In the case of setting the PDLC panel 60 to the transmittance state while performing black display in the CF liquid crystal panel 50 in the above second and third frame periods, for example, shield data may be given to each pixel in place of transmittance data, by scan drive of the CF liquid crystal panel 50.

Figure 10:
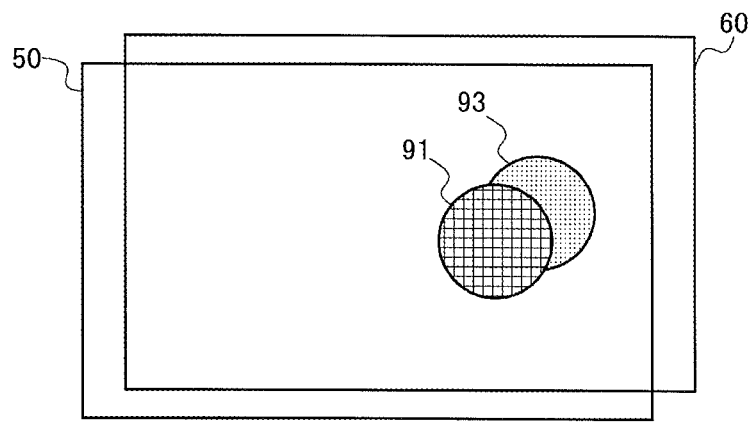
FIG. 10 is view for explaining superposition of the CF liquid crystal panel and the PDLC panel.

FIG. 10 is a view for explaining superposition of the CF liquid crystal panel 50 and the PDLC panel 60. In the case where the number of pixels of the PDLC panel 60 has been set equal to or larger than the number of pixels of the CF liquid crystal panel 50, as shown in FIG. 10, a part to be set to the spreading state in the PDLC panel 60 (hereinafter, referred to as a "spreading state part 93") can be set in accordance with the image display part 91 in the CF liquid crystal panel 50. In this case, in parts other than the image display part 91 of the screen, the background may be allowed to be transmitted. It should be noted that, even when the number of pixels of the PDLC panel 60 is smaller than the number of pixels of the CF liquid crystal panel 50, the background can be allowed to be transmitted in a part of the screen when the number of pixels of the PDLC panel 60 is plural. The pixels in the PDLC panel 60 are not necessarily required to be arranged in a matrix shape. By setting the pixel arrangement of the PDLC panel 60 according to the shape of the image to be displayed in the CF liquid crystal panel 50, even when the number of pixels of the PDLC panel 60 is smaller than the number of pixels of the CF liquid crystal panel 50, various states (the spreading state, the transmittance state, and the intermediate state) of the PDLC panel 60 can be more appropriately applied to the image display. The spreading state and the transmittance state may be switched in the whole PDLC panel 60 by adopting a configuration in which the number of pixels of the PDLC panel 60 is one.

1.6 Effects

According to the present embodiment, in the image display device 1 that displays a color image, the PDLC panel 60 in the spreading state spreads the light source light emitted by the light source unit 100 (the first PDLC light source unit 70*a*). The CF liquid crystal panel 50 controls the transmission factor of the spreading light (more specifically, the front direction vertical component of the spreading light), so that image display is performed. Therefore, by shielding the spreading light by the CF liquid crystal panel 50, black display can be performed. Because the image to be displayed is formed by not the light source unit 100, but by the CF liquid crystal panel 50, restriction of the installation position of the light source unit 100 can be relaxed. When the PDLC panel 60 is in the transmittance state, the background light can be transmitted. Further, because the CF liquid crystal panel 50 capable of transmitting incident light as color light is employed, a configuration required for drive can be simplified, as compared with the case of a employing the field sequential system.

According to the present embodiment, the PDLC panel 60 includes a plurality of PDLC display elements 61, and each of the PDLC display elements 61 can be switched between the spreading state and the transmittance state. Therefore, a part to be set to the spreading state and a part to be set to the transmittance state can be set in the PDLC panel 60 in accordance with the display position of the image. Accordingly, image display and background transmittance can be performed simultaneously.

According to the present embodiment, in the PDLC panel 60, the light source light is applied to a part that should be set to the spreading state, and the light source light is not applied to a part that should be set to the transmittance state. Therefore, it is possible to appropriately mix in one screen the part where image display is performed and the part where background transmittance is performed.

Further, according to the present embodiment, because the PDLC display element 61 is set to the spreading state synchronously with the CF liquid crystal display element 51, a part to be set to the spreading state and a part to be set to the transmittance state in the PDLC panel 60 are set following the images displayed in the CF liquid crystal panel 50. Therefore, in the video display and the like, the spreading light from the PDLC panel 60 can be securely applied to the CF liquid crystal panel 50. Accordingly, picture quality at a video displaying time and the like can be improved.

Further, according to the present embodiment, by utilizing the intermediate state of the PDLC display element 61 (the PDLC panel 60), various display can be performed.

Further, according to the present embodiment, drive for performing the image display can be securely performed by using the signal control circuit 10 including the image control unit 12, the CF liquid crystal display element signal control unit 14, the PDLC display element signal control unit 15, and the light source signal control unit 16.

According to the present embodiment, because the display-image position assigning data Da is included in the input signal IN, it is possible to securely reflect a display position of the image intended in the generation source of the input signal IN.

According to the present embodiment, by using the CF liquid crystal timing assignment signal CT, the PDLC timing assignment signal PT, and the light source timing assignment signal LT, each of which is generated based on the drive timing control signal DT, it is possible to securely control the drive of each of the CF liquid crystal display elements 51, each of the PDLC display elements 61, and each of the light sources 71. By separating the timing assignment control unit 13 from the image control unit 12 and also by using the memory or the register, it becomes easy to individually adjust the operation start time of each module as needed.

According to the present embodiment, by applying the light source light to the rear surface of the PDLC panel 60, in the case where the spreading effect to the transmittance direction (the direction of transmitting the incident light) by the PDLC panel 60 is higher than the spreading effect to the reflection direction (the direction of reflecting the incident light), the light source light of the first PDLC light source unit 70*a* is effectively utilized. More specifically, the front direction vertical component of the spread light source light becomes large. Therefore, luminance of display image can be improved.

According to the present embodiment, in the case where the first PDLC light source unit 70*a* has directivity at a level at which light can be applied to a part of the PDLC panel 60 as described above, the first PDLC light source unit 70*a* can apply the light source light to each separation area. Therefore, the first PDLC light source unit 70*a* can perform area active drive (also referred to as local dimming drive) for adjusting the light intensity of the light source light for each separation area. By such area active drive like this, the light source light can be emitted from the first PDLC light source unit 70*a* in accordance with the scan directions of the CF liquid crystal panel 50 and the PDLC panel 60. Therefore, luminance unevenness due to shortage of a response speed of a liquid crystal in the CF liquid crystal panel 50 can be reduced, as compared with the case of uniformly emitting the light source light to the whole surface of the PDLC panel 60.

1.7 First Modification

Figure 11:
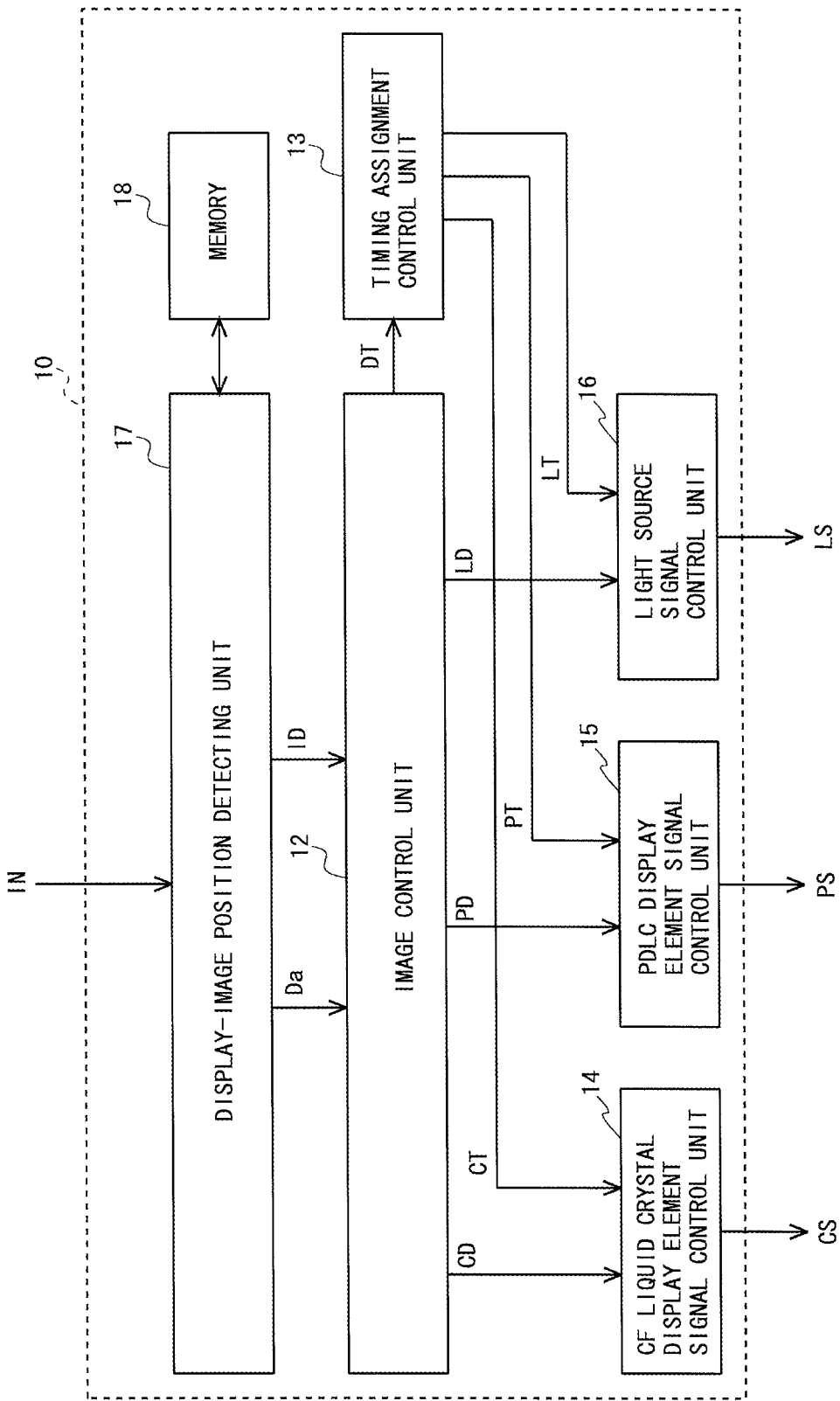
FIG. 11 is a block diagram showing a configuration of a signal processing circuit according to a first modification of the first embodiment.

FIG. 11 is a block diagram showing a configuration of the signal processing circuit 10 according to the first modification of the first embodiment. The signal processing circuit 10 according to the present modification includes a display-image position detecting unit 17 and a memory 18, in place of the signal processing circuit 10 according to the first embodiment. It should be noted that the input signal IN according to the present modification includes the image data ID.

The display-image position detecting unit 17 can perform a processing of assigning a position in the screen at which the background light is not allowed to be transmitted (hereinafter, referred to as a "first processing") by determining in real time a display position of the image by a frame interpolation processing and the like. Further, it is possible to perform a processing of assigning a position in the screen at which the background light is not allowed to be transmitted (hereinafter, referred to as a "second processing") by setting a display position of the image by using the memory 18 provided at the outside of the display-image position detecting unit 17, or a register or a ROM not shown, for example. In this case, the memory 18 holds information showing the display position of the image.

As the first processing, there is the following processing, for example. At the time of outputting data in which three primary color signal values included in the input signal IN (the image data ID) are equal to each other (that is, data desired to be transmitted or data that does no require color display) in a certain pixel (hereinafter, referred to as a "corresponding pixel"), when each data in a certain range of the corresponding pixel is the data in which three primary color signal values are equal to each other like in the corresponding pixel, the corresponding pixel is determined as a non-display position of the image. According to the first processing, it is possible to set the display position of the image in real time, and set the state of each of the PDLC display elements 61 according to the display position without including the display-image position assigning data Da in the input signal IN. It should be noted that, in the first processing, the configuration may be such that, at the time of outputting the data in which three primary color signal values included in the input signal IN are similar to each other, when each data in a certain range of the corresponding pixel is the data in which three primary color signal values are similar to each other like the corresponding pixel, the corresponding pixel is determined as the non-display position of the image.

As for the second processing, for example, by assigning a predetermined region in the screen, as a region in which the background is not desired to be transmitted, it is possible to display the image in the predetermined region determined in advance and set the state of each PDLC display element 61 according to the position of the predetermined region, without including the display-image position assigning data Da in the input signal IN.

1.8 Second Modification

Figure 12:
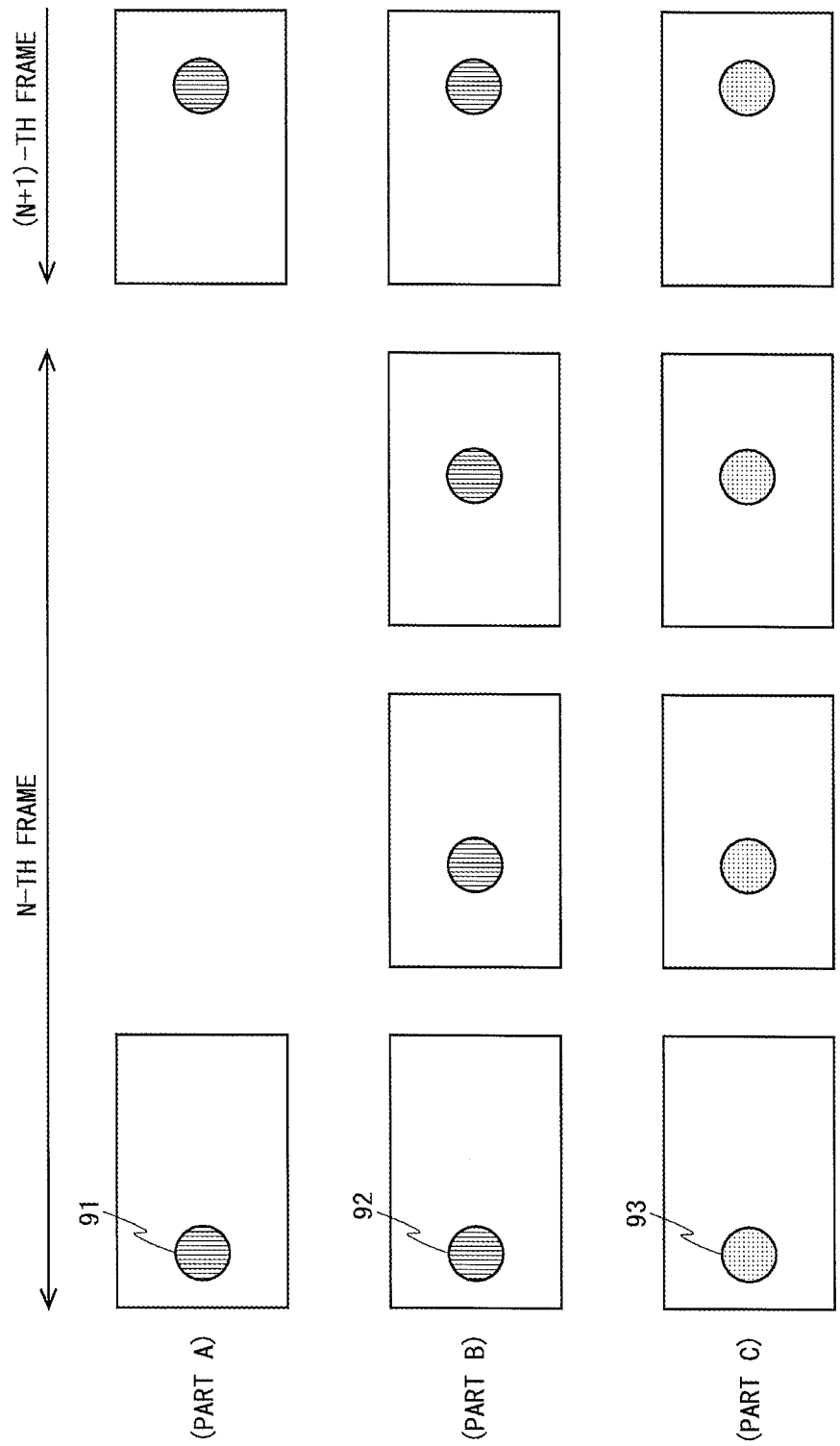
FIG. 12 is a view for explaining the operation in each sub-frame period according to a second modification of the first embodiment. It should be noted that the part A shows a frame image, the part B shows a sub-frame image, and the part C shows a spreading state part.

According to a second modification of the first embodiment, the signal processing circuit 10 (more specifically, the image control unit 12) separates one frame period into a plurality of sub-frame periods. The number of separation of the sub-frame period is assumed to be three, for example. FIG. 12 is a view for explaining the operation in each sub-frame period in the present modification. More specifically, the part A in FIG. 12 shows a frame image (an image indicated by the image data ID). The part B in FIG. 12 shows a sub-frame image (an image in each sub-frame period), and the part C in FIG. 12 shows a spreading state part. The image control unit 12 in the present modification performs frame interpolation utilizing a sub-frame period, based on the image data ID or the input signal IN. The configuration of the signal processing circuit 10 (the image control unit 12) according to the present modification may be any of the configuration of the first embodiment and the configuration of the first modification. However, it is desirable to employ the configuration of the first modification in which a display position of the image can be determined in real time. Hereinafter, in the present modification, description will be made on the assumption that the configuration in the first modification is employed as the configuration of the signal processing circuit 10.

The image control unit 12 sets a second sub-frame image and a third sub-frame image of an N-th frame as images for frame interpolation. Therefore, as shown in the part B in FIG. 12, a display part 92 smoothly moves. The spreading state part 93 is set in accordance with the display part 92. The operation of an N+1-th frame is similar to that of the N-th frame.

According to the present modification, because the frame interpolation utilizing the sub-frame periods is performed, smooth video display can be performed.

1.9 Third Modification

Figure 13:
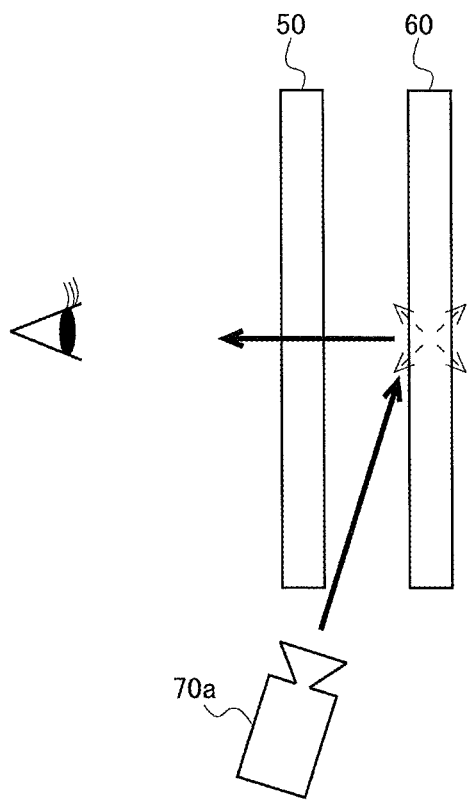
FIG. 13 is a sectional view of one pixel component of a CF liquid crystal panel and a PDLC panel according to a third modification of the first embodiment.

FIG. 13 is a sectional view of one pixel component of the CF liquid crystal panel 50 and the PDLC panel 60 according to a third modification of the first embodiment. As shown in FIG. 13, the first PDLC light source unit 70a according to the present modification applies the light source light to the front surface (one main surface) of the PDLC panel 60. Because the CF liquid crystal panel 50 is positioned on the front surface side of the PDLC panel 60, it is desirable to provide an air layer and the like between the CF liquid crystal panel 50 and the PDLC panel 60, in order to make the light source light incident on the front surface of the PDLC panel 60, in the present modification.

According to the present modification, by applying the light source light to the front surface of the PDLC panel 60, effects similar to those in the first embodiment can be obtained. It should be noted that, in the case where the spreading effect to the reflection direction by the PDLC panel 60 is higher than the spreading effect to the transmittance direction, the light source light of the first PDLC light source unit 70a is effectively utilized in image displaying. More specifically, the front direction vertical component of the spread light source light becomes large. Therefore, luminance of display image can be improved.

1.10 Fourth Modification

Figure 14:
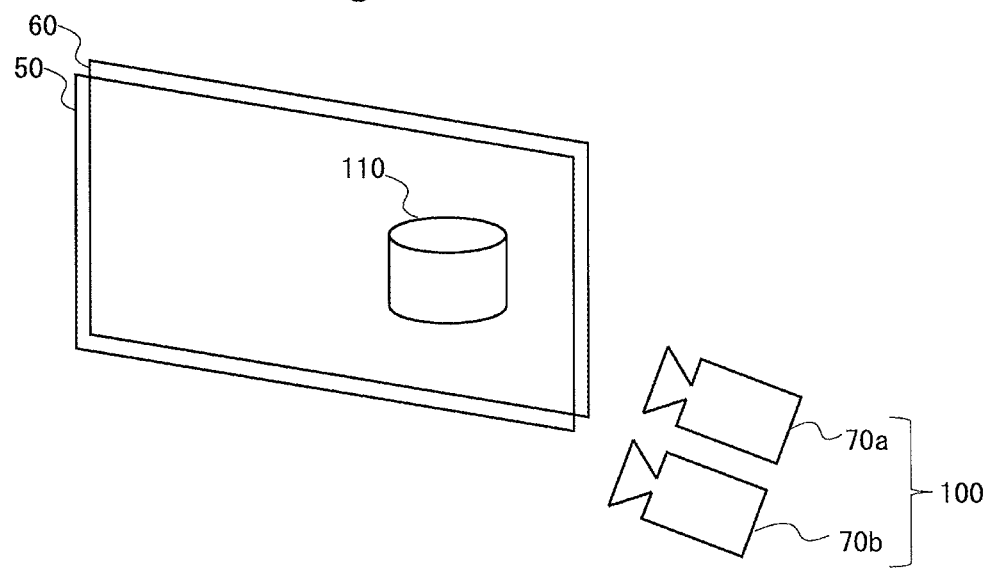
FIG. 14 is an oblique perspective view for explaining the arrangement of a CF liquid crystal panel, a PDLC panel, and a first and second PDLC light source units according to a fourth modification of the first embodiment.

FIG. 14 is an oblique perspective view for explaining the arrangement of the CF liquid crystal panel 50, the PDLC panel 60, and the first and second PDLC light source units 70a and 70b according to the fourth modification of the first embodiment. The present modification is the addition of the second PDLC light source unit 70b to the first embodiment. The second PDLC light source unit 70b has a configuration similar to that of the first PDLC light source unit 70a. The second PDLC light source unit 70b corresponds to a second second-display panel light source unit. In the present modification, the first and second PDLC light source units 70a and 70b constitute the light source unit 100.

Figure 15:
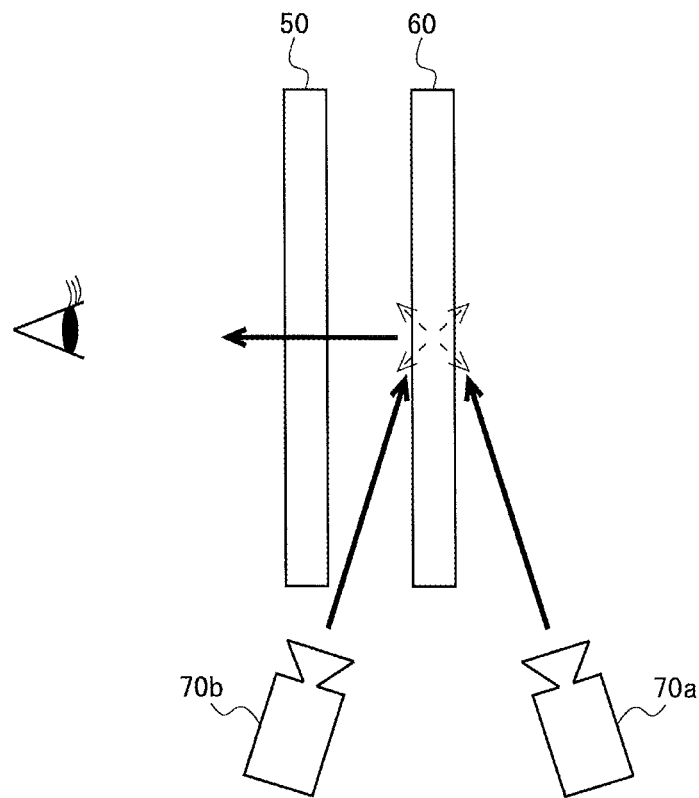
FIG. 15 is a sectional view of one pixel component of the CF liquid crystal panel and the PDLC panel shown in FIG. 14.

FIG. 15 is a sectional view of one pixel component of the CF liquid crystal panel 50 and the PDLC panel 60 shown in FIG. 14. As shown in FIG. 15, the first and second PDLC light source units 70a and 70b apply the light source light to the rear surface and the front surface (both main surfaces) of the PDLC panel 60, respectively. It should be noted that, similarly to the third modification of the first embodiment, in order to make the light source light incident on the front surface of the PDLC panel 60, it is desirable to provide an air layer and the like between the CF liquid crystal panel 50 and the PDLC panel 60. It is desirable that the first and second PDLC light source units 70a and 70b apply the light source light to mutually the same position.

According to the present modification, because the light source light is applied to the rear surface and the front surface of the PDLC panel 60, luminance of the display image can be improved, regardless of a high-and-low relation of the spreading effect to the reflection direction and the spreading effect to the transmittance direction of the PDLC panel 60.

2. Second Embodiment

2.1 Light Guide Plate

Figure 16:
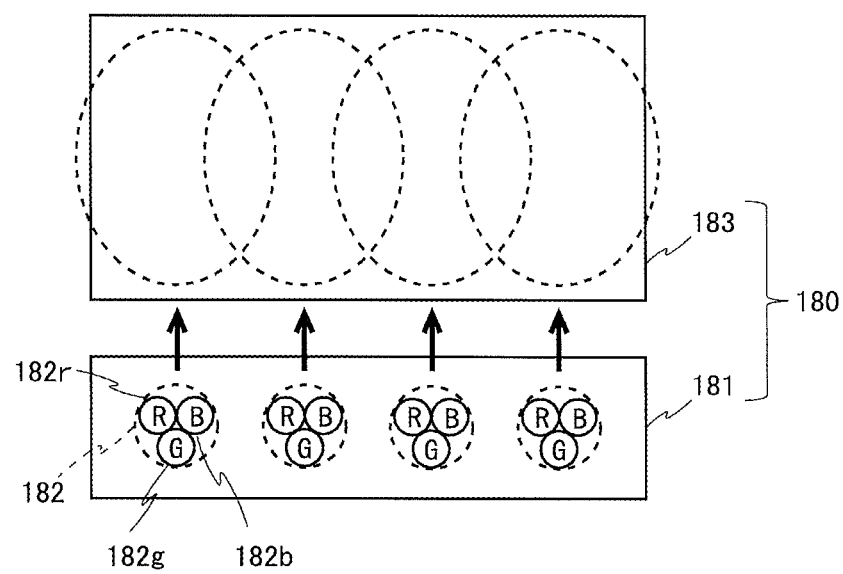
FIG. 16 is a view showing a configuration of a backlight unit including a general light guide plate.

According to a second embodiment of the present invention, a light guide plate is used. Out of the components of the present embodiment, the same components as those in the first embodiment will be attached with the same reference characters and their description will be suitably omitted. FIG. 16 is a view showing a configuration of a backlight unit 180 including a general light guide plate 183. The backlight unit 180 includes a light-guide plate light source unit 181 and a light guide plate 183. The light-guide plate light source unit 181 includes a plurality of light sources 182 each including one light emitting element 182r, one light emitting element 182g, and one light emitting element 182b that have a red color, a green color, and a blue color, respectively. The configuration of the light source 182 is basically similar to the configuration of the light source 71, and can be variously changed. The light guide plate 183 guides light source light emitted by the light-guide plate light source unit 181, and emits the guided light source light. The general light guide plate 183 guides incident light source light with no directivity, as shown in FIG. 16. Accordingly, the whole light guide plate 183 emits light.

Figure 17:
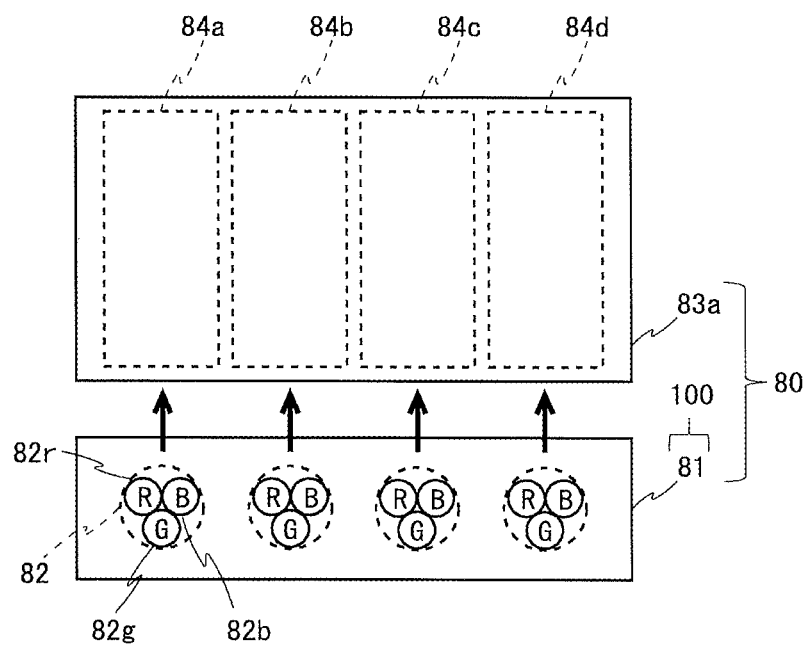
FIG. 17 is a view showing a configuration of a backlight unit according to a second embodiment of the present invention.

FIG. 17 is a view showing a configuration of a backlight unit 80 according to the present embodiment. The backlight unit 80 includes a light-guide plate light source unit 81 and a light guide plate 83a (hereinafter, for convenience sake, referred to as a "first light guide plate"). The light-guide plate light source unit 81 includes a plurality of light sources 82 each including one light emitting element 82r, one light emitting element 82g, and one light emitting element 82b that have a red color, a green color, and a blue color, respectively. The configuration of the light source 82 is basically similar to the configuration of the light source 71, and can be variously changed. In the present embodiment, the light-guide plate light source unit 81 constitutes a light source unit 100, and the PDLC panel 60 and the backlight unit 80 constitute the light irradiating unit 90. It should be noted that the backlight unit 80 is driven by the light source drive circuit 40, in a similar manner to that of the first PDLC light source unit 70a in the first embodiment.

The first light guide plate 83a in the present embodiment is formed into a plurality (four in FIG. 17) of blocks 84a to 84d arrayed in a row. Each of the blocks guides the light source light emitted by the corresponding light source 82, and emits the guided light source light. The first light guide plate 83a emits light for each block of the first light guide plate 83a by guiding incident light source light with directivity. Therefore, area active drive can be performed. Such a configuration of the first light guide plate 83a is disclosed in Japanese Patent Application Laid-Open No. 2008-34372, for example. The block of the first light guide plate 83a can be made correspond to the separation area of the PDLC panel 60, for example.

2.2 Arrangement of Panel and Light Guide Plate

Figure 18:
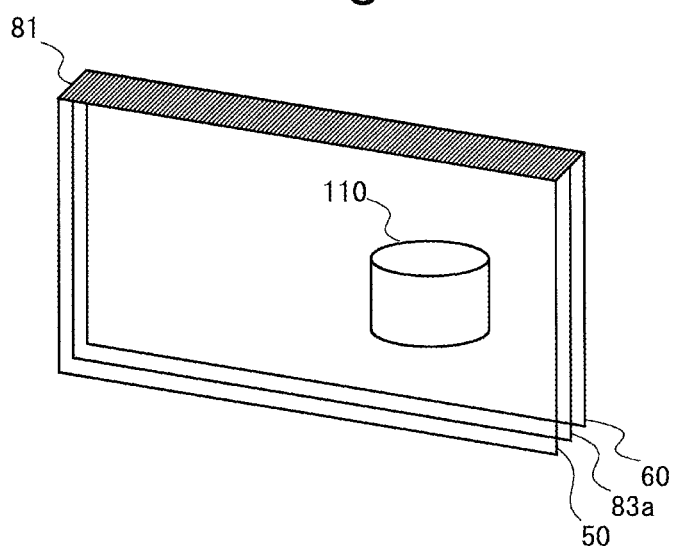
FIG. 18 is an oblique perspective view for explaining the arrangement of a CF liquid crystal panel, a PDLC panel, and a first light guide plate according to the second embodiment.
Figure 19:
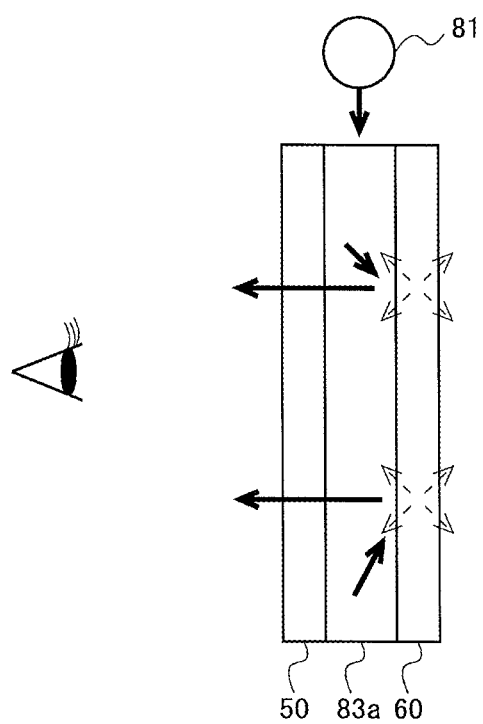
FIG. 19 is a sectional view of one pixel component of the CF liquid crystal panel, the PDLC panel, and the first light guide plate shown in FIG. 18.

FIG. 18 is an oblique perspective view for explaining the arrangement of the CF liquid crystal panel 50, the PDLC panel 60, and the first light guide plate 83a according to the present embodiment. As shown in FIG. 19, a first light guide plate 83a and the PDLC panel 60 are sequentially arranged from a side of the CF liquid crystal panel 50. That is, the first light guide plate 83a is positioned on the rear surface of the CF liquid crystal panel 50, and the PDLC panel 60 is positioned on the rear surface of the first light guide plate 83a. The light-guide plate light source unit 81 is arranged on the upper end part (the upper side of the paper surface) of the first light guide plate 83a. It should be noted that the position of the light-guide plate light source unit 81 is not limited to the example shown here, and the light-guide plate light source unit 81 may be arranged at least at any of the lower end part (the lower side of the paper surface), the right end part (the right side of the paper surface), and the left end part (the left side of the paper surface) of the first light guide plate 83a. However, in the case of emitting the light source light in accordance with the scan directions of the CF liquid crystal panel 50 and the PDLC panel 60 as described above, it is desirable that the light-guide plate light source unit 81 is arranged at one end or both ends of the first light guide plate 83a in the extension direction of the scanning line SL, in the present embodiment.

FIG. 19 is a sectional view of one pixel component of the CF liquid crystal panel 50, the PDLC panel 60, and the first light guide plate 83a shown in FIG. 18. An air layer and the like may be provided between the CF liquid crystal panel 50 and the first light guide plate 83a, and between the first light guide plate 83a and the PDLC panel 60. In the following description, it is assumed that the transmission factor of the first light guide plate 83a is relatively high.

At the image displaying time, a voltage is not applied to the PDLC display element 61, and the PDLC display element 61 is in the spreading state. At this time, the light source light emitted by the light-guide plate light source unit 81 is guided by the first light guide plate 83a, and is emitted to respective focused separation areas of the CF liquid crystal panel 50 and the PDLC panel 60. More specifically, the light source light is emitted from the light-guide plate light source unit 81 to the block corresponding to the focused separation area (hereinafter, referred to as a "focused block"), and the light source light guided by the focused block is emitted to respective focused separation areas of the CF liquid crystal panel 50 and the PDLC panel 60. Therefore, the light source light incident on the PDLC display element 61 is spread. The front direction vertical component of the spread light source light is emitted to the CF liquid crystal display element 51 by being transmitted through the first light guide plate 83a. The background light is also incident on the PDLC display element 61. Because the PDLC display element 61 is in the spreading state as described above, the background light incident on the PDLC display element 61 is spread, and the front direction vertical component of the spread background light is emitted to the CF liquid crystal display element 51 through the first light guide plate 83a. In the following, for convenience of description, the light source light emitted to the rear surface side of the first light guide plate 83a will be referred to as "rear emission light source light", and the light source light emitted to the front surface side of the first light guide plate 83a will be referred to as "front emission light source light".

In this way, at the image displaying time, the light irradiating unit 90 including the PDLC panel 60 and the backlight unit 80 irradiates the CF liquid crystal panel 50 (the CF liquid crystal display element 51) with the light including the front emission light source light, the front direction vertical component of the spread rear emission light source light, and the front direction vertical component of the spread background light. At the image displaying time, because the PDLC panel 60 spreads the background light, the background light that reaches the CF liquid crystal panel 50 is only the spread front direction vertical component. Therefore, the influence of the background light given to the display image is sufficiently suppressed.

At the whole surface non-displaying time, a voltage is applied to the PDLC display element 61, and the PDLC display element 61 is in the transmittance state. Further, from the light-guide plate light source unit 81, the light source light is not emitted to any block of the first light guide plate 83a. Therefore, only the background light transmitted through the PDLC display element 61 and the first light guide plate 83a is applied to the CF liquid crystal display element 51. Accordingly, the background is transmitted.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 81 to the focused block, and the light source light is emitted from the light-guide plate light source unit 81 to other blocks. In this way, to the CF liquid crystal display element 51 in the separation area in which image display is not performed, the background light transmitted through the PDLC display element 61 and the first light guide plate 83a is applied. To the CF liquid crystal display element 51 in the separation area in which image display is performed, light including the front emission light source light, the front direction vertical component of the spread rear emission light source light, and the front direction vertical component of the spread background light is applied. Therefore, it is possible to simultaneously perform image display and background transmittance, and also appropriately mix in one screen a part where image display is performed and a part where background transmittance is performed.

There are broadly two kinds of light guide plates that are for the front light and for the back light. In both two kinds, light source light is emitted to both the front surface side and the rear surface side. Therefore, the first light guide plate 83a employed in the above configuration may be any of the light guide plate for the front light and the light guide plate for the back light. It should be noted that the light guide plate for the front light has much rear emission light source light and has little front emission light source light, as compared with the light guide plate for the back light. The configuration of the light guide plate for the front light is disclosed in Japanese Patent Application Laid-Open No. 2006-106614, for example.

2.3 Effects

According to the present embodiment, the light source light emitted by the light-guide plate light source unit 81 is applied to the PDLC panel 60 via the first light guide plate 83a. The CF liquid crystal panel 50 controls the transmission factor of the spreading light so that image display is performed. In this way, effects similar to those in the first embodiment can be obtained.

Further, according to the present embodiment, because the first light guide plate 83a formed into blocks is used, it is possible to arrange such that the light source light is applied to a part that should be set to the spreading state and the light source light is not applied to a part that should be set to the transmittance state in the PDLC panel 60. Therefore, it is possible to appropriately mix in one screen the part where image display is performed and the part where background transmittance is performed. Further, because the light source light can be applied for each separation area by the first light guide plate 83a formed into blocks, it is possible to perform the area active drive in a similar manner to that in the first embodiment. By such area active drive like this, the light source light can be emitted from the block in accordance with the scan directions of the CF liquid crystal panel 50 and the PDLC panel 60. Therefore, luminance unevenness due to shortage of a response speed of a liquid crystal in the CF liquid crystal panel 50 can be reduced, as compared with the case of uniformly emitting the light source light to the whole surface of the PDLC panel 60.

According to the present embodiment, in the case where the spreading effect to the reflection direction by the PDLC panel 60 is higher than the spreading effect to the transmittance direction, the rear emission light source light of the first light guide plate 83a can be effectively utilized in image displaying by sequentially arranging the first light guide plate 83a and the PDLC panel 60 from a side of the CF liquid crystal panel 50. More specifically, the front direction vertical component of the spread rear emission light source light becomes large. Therefore, luminance of display image can be improved. Further, because the front direction vertical component of the spread background light becomes small, the influence of the background light given to the display image can be sufficiently suppressed.

2.4 First Modification

Figure 20:
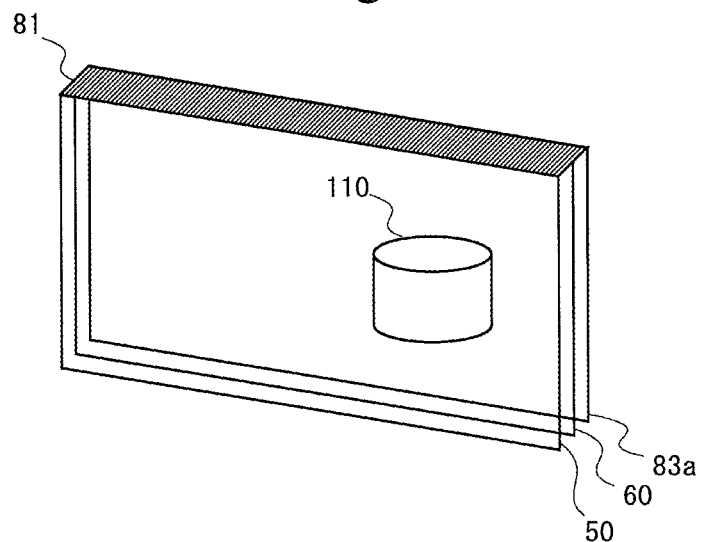
FIG. 20 is an oblique perspective view for explaining the arrangement of a CF liquid crystal panel, a PDLC panel, and a first light guide plate according to a first modification of the second embodiment.

FIG. 20 is an oblique perspective view for explaining the arrangement order of the CF liquid crystal panel 50, the PDLC panel 60, and the first light guide plate 83a according to the first modification of the second embodiment. In the present modification, the PDLC panel 60 and the first light guide plate 83a are sequentially arranged from a side of the CF liquid crystal panel 50. That is, the PDLC panel 60 is positioned on the rear surface of the CF liquid crystal panel 50, and the first light guide plate 83a is positioned on the rear surface of the PDLC panel 60.

Figure 21:
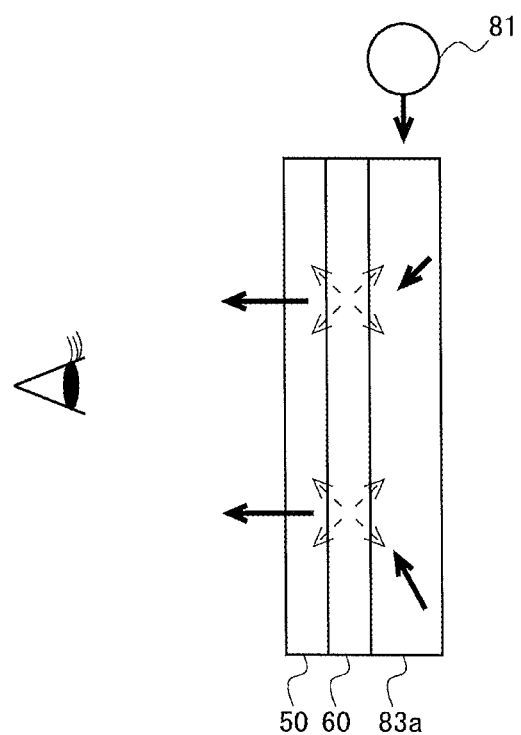
FIG. 21 is a sectional view of one pixel component of the CF liquid crystal panel, the PDLC panel, and the first light guide plate shown in FIG. 20.

FIG. 21 is a sectional view of one pixel component of the CF liquid crystal panel 50, the PDLC panel 60, and the first light guide plate 83a shown in FIG. 20. At the image displaying time, a voltage is not applied to the PDLC display element 61, and the PDLC display element 61 is in the spreading state. At this time, the light source light emitted by the light-guide plate light source unit 81 is guided by the first light guide plate 83a, and is emitted to the focused separation area of the PDLC panel 60 positioned on the front surface of the first light guide plate 83a. More specifically, the light source light is emitted from the light-guide plate light source unit 81 to the focused block. The light source light guided by the focused block is emitted to the focused separation area of the PDLC panel 60. Therefore, the light source light incident on the PDLC display element 61 is spread. The front direction vertical component of the spread light source light is emitted to the CF liquid crystal display element 51. The background light transmitted through the first light guide plate 83a is also incident on the PDLC display element 61. Because the PDLC display element 61 is in the spreading state as described above, the background light incident on the PDLC display element 61 is spread, and the front direction vertical component of the spread background light is emitted to the CF liquid crystal display element 51. It should be noted that, in the present modification, because the rear emission light source light does not reach the CF liquid crystal display element 51, the rear emission light source light does not contribute to image displaying.

In this way, at the image displaying time, the light irradiating unit 90 including the PDLC panel 60 and the backlight unit 80 irradiates the CF liquid crystal panel 50 (the CF liquid crystal display element 51) with the light including the front direction vertical component of the spread front emission light source light, and the front direction vertical component of the spread background light. At the image displaying time, because the PDLC panel 60 spreads the background light, the background light that reaches the CF liquid crystal panel 50 is only the spread front direction vertical component. Therefore, the influence of the background light given to the display image is sufficiently suppressed.

At the whole surface non-displaying time, a voltage is applied to the PDLC display element 61, and the PDLC display element 61 is in the transmittance state. Further, from the light-guide plate light source unit 81, the light source light is not emitted to any block of the first light guide plate 83a. Therefore, only the background light transmitted through the PDLC display element 61 and the first light guide plate 83a is applied to the CF liquid crystal display element 51. Accordingly, the background is transmitted.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 81 to the focused block, and the light source light is emitted from the light-guide plate light source unit 81 to other blocks. In this way, to the CF liquid crystal display element 51 in the separation area in which image display is not performed, the background light transmitted through the PDLC display element 61 and the first light guide plate 83a is applied. To the CF liquid crystal display element 51 in the separation area in which image display is performed, light including a front direction vertical component of the spread front emission light source light and a front direction vertical component of the spread background light is applied. Therefore, similarly to the second embodiment, it is possible to simultaneously perform image display and background transmittance, and also appropriately mix in one screen a part where image display is performed and a part where background transmittance is performed.

According to the present modification, effects similar to those in the second embodiment can be obtained by sequentially arranging the PDLC panel 60 and the first light guide plate 83a from a side of the CF liquid crystal panel 50. In the case where the spreading effect to the transmittance direction by the PDLC panel 60 is higher than the spreading effect to the reflection direction, the front emission light source light of the first light guide plate 83a is effectively utilized in image displaying. More specifically, the front direction vertical component of the front emission light source light becomes large. Therefore, luminance of display image can be improved. It should be noted that, in the present modification, in the case of employing the light guide plate for the back light having much front emission light source light than the rear emission light source light, as the first light guide plate 83a, luminance of the display image can be improved.

2.5 Second Modification

Figure 22:
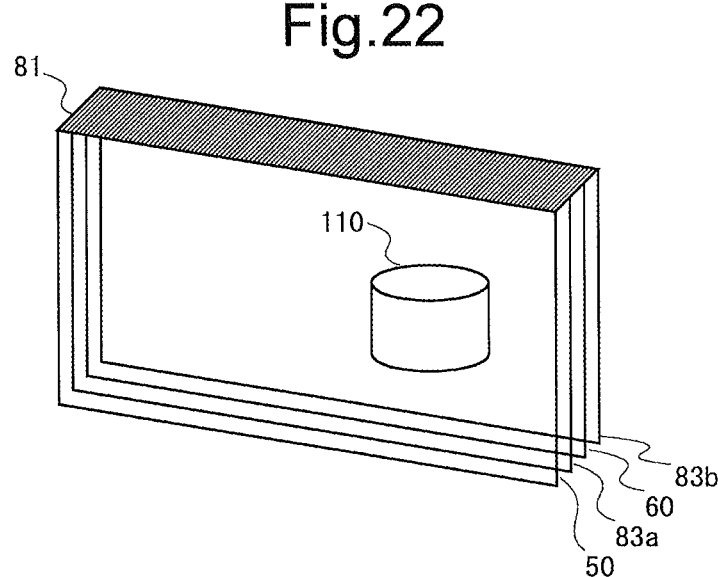
FIG. 22 is an oblique perspective view for explaining the arrangement of a CF liquid crystal panel, a PDLC panel, and a first and second light guide plates according to a second modification of the second embodiment.

FIG. 22 is an oblique perspective view for explaining the arrangement order of the CF liquid crystal panel 50, the PDLC panel 60, and the first and second light guide plates 83a and 83b according to the second modification of the second embodiment. Properties of the first and second light guide plates 83a and 83b may be mutually the same or mutually different. However, the transmission factor of the second light guide plate 83b is set relatively high, similarly to the transmission factor of the first light guide plate 83a. Further, the second light guide plate 83b is formed into a plurality of blocks arrayed in one row, in a similar manner to that of the first light guide plate 83a. In the following, for convenience of description, similarly to the first light guide plate 83a, the light source light emitted to the rear surface side of the second light guide plate 83b will be also referred to as "rear emission light source light", and the light source light emitted to the front surface side of the second light guide plate 83b will be also referred to as "front emission light source light". In the present modification, the first light guide plate 83a, the PDLC panel 60, and the second light guide plate 83b are sequentially arranged from a side of the CF liquid crystal panel 50. That is, the first light guide plate 83a is positioned on the rear surface of the CF liquid crystal panel 50, the PDLC panel 60 is positioned on the rear surface of the first light guide plate 83a, and the second light guide plate 83b is positioned on the rear surface of the PDLC panel 60.

Figure 23:
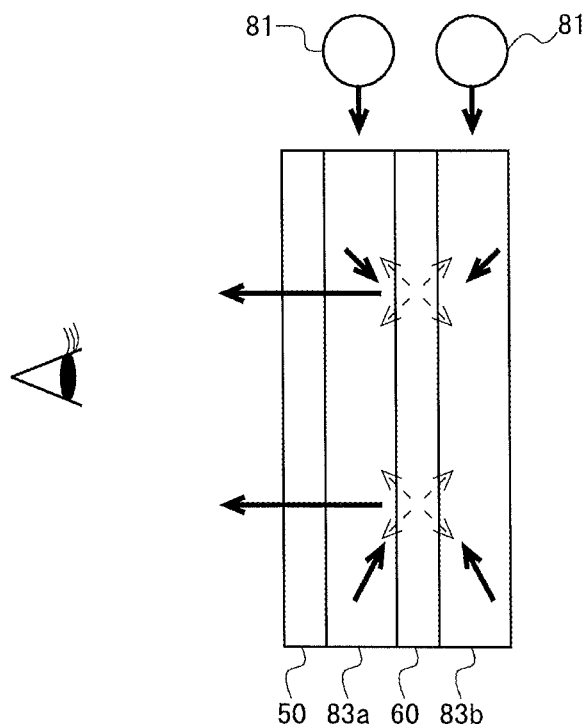
FIG. 23 is a sectional view of one pixel component of the CF liquid crystal panel, the PDLC panel, and the first and second light guide plates shown in FIG. 22.

FIG. 23 is a sectional view of one pixel component of the CF liquid crystal panel 50, the PDLC panel 60, and the first and second light guide plates 83a and 83b shown in FIG. 22. At the image displaying time, a voltage is not applied to the PDLC display element 61, and the PDLC display element 61 is in the spreading state. At this time, the light source light emitted by the light-guide plate light source unit 81 is guided by the first and second light guide plates 83a and 83b, and is emitted to respective focused separation areas of the CF liquid crystal panel 50 and the PDLC panel 60. More specifically, the light source light is emitted from the light-guide plate light source unit 81 to the focused blocks of the first and second light guide plates 83a and 83b. The light source light guided by the first light guide plate 83a is emitted to respective focused separation areas of the CF liquid crystal panel 50 and the PDLC panel 60, and the light source light guided by the second light guide plate 83b is emitted to the focused separation area of the PDLC panel 60. Therefore, the light source light incident on the PDLC display element 61 is spread. The front direction vertical component of the spread light source light is emitted to the CF liquid crystal display element 51 by being transmitted through the first light guide plate 83a. The front emission light source light of the first light guide plate 83a is emitted to the CF liquid crystal display element 51. The background light transmitted through the second light guide plate 83b is also incident on the PDLC display element 61. Because the PDLC display element 61 is in the spreading state as described above, the background light incident on the PDLC display element 61 is spread, and the front direction vertical component of the spread background light is emitted to the CF liquid crystal display element 51 through the first light guide plate 83a. It should be noted that, because the rear emission light source light of the second light guide plate 83b does not reach the CF liquid crystal display element 51, the rear emission light source light does not contribute to image displaying.

In this way, at the image displaying time, the light irradiating unit 90 including the PDLC panel 60 and the backlight unit 80 irradiates the CF liquid crystal panel 50 (the CF liquid crystal display element 51) with the light including the front emission light source light of the first light guide plate 83a, the front direction vertical component of the rear emission light source light of the spread first light guide plate 83a, the front direction vertical component of the front emission light source light of the spread second light guide plate 83b, and the front direction vertical component of the spread background light. At the image displaying time, because the PDLC panel 60 spreads the background light, the background light that reaches the CF liquid crystal panel 50 is only the spread front direction vertical component. Therefore, the influence of the background light given to the display image is sufficiently suppressed.

At the whole surface non-displaying time, a voltage is applied to the PDLC display element 61, and the PDLC display element 61 is in the transmittance state. Further, from the light-guide plate light source unit 81, the light source light is not emitted to any block of the first light guide plate 83a and any block of the second light guide plate 83b. Therefore, only the background light transmitted through the second light guide plate 83b, the PDLC display element 61, and the first light guide plate 83a is applied to the CF liquid crystal display element 51. Accordingly, the background is transmitted.

At the partially non-displaying time, the PDLC display element 61 is in the transmittance state in a similar manner to that at the whole surface non-displaying time. On the other hand, unlike at the whole surface non-displaying time, the light source light is not emitted from the light-guide plate light source unit 81 to the focused block of the first and second light guide plates 83a and 83b, and the light source light is emitted from the light-guide plate light source unit 81 to other blocks of the first and second light guide plates 83a and 83b. In this way, to the CF liquid crystal display element 51 in the separation area in which image display is not performed, the background light transmitted through the second light guide plate 83b, the PDLC display element 61, and the first light guide plate 83a is applied. To the CF liquid crystal display element 51 in the separation area in which image display is performed, light including the front emission light source light of the first light guide plate 83a, the front direction vertical component of the spread rear emission light source light of the first light guide plate 83a, the front direction vertical component of the spread front emission light source light of the second light guide plate 83b, and the front direction vertical component of the spread background light is applied. Therefore, it is possible to simultaneously perform image display and background transmittance, and also appropriately mix in one screen a part where image display is performed and a part where background transmittance is performed.

According to the present modification, effects similar to those in the second embodiment can be obtained by sequentially arranging the first light guide plate 83a, the PDLC panel 60, and the second light guide plate 83b, from a side of the CF liquid crystal panel 50. Further, according to the present modification, the rear emission light source light and the front emission light source light emitted respectively from the first and second light guide plates 83a and 83b are spread by the PDLC panel 60. The front direction vertical component of the rear emission light source light and the front emission light source light is applied to the CF liquid crystal panel 50. Therefore, luminance of the display image can be improved, regardless of a high-and-low relation of the spreading effect to the reflection direction and the spreading effect to the transmittance direction by the PDLC panel 60.

3. Third Embodiment

3.1 Arrangement of Panel, Light Source Unit, and Light Guide Plate

Figure 24:
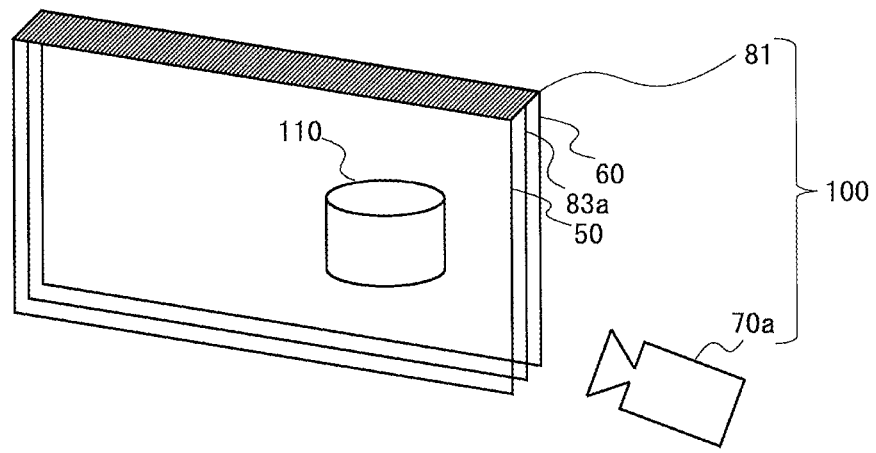
FIG. 24 is an oblique perspective view for explaining the arrangement of a CF liquid crystal panel, a PDLC panel, a PDLC light source unit, and a first light guide plate according to a third embodiment of the present invention.

FIG. 24 is an oblique perspective view for explaining the arrangement of the CF liquid crystal panel 50, the PDLC panel 60, the first PDLC light source unit 70a, and the first light guide plate 83a according to the third embodiment of the present invention. Out of the components of the present embodiment, the same components as those in the first embodiment or the second embodiment will be attached with the same reference characters and their description will be suitably omitted. In the present embodiment, the first PDLC light source unit 70a in the first embodiment is also used in order to improve luminance of a part where image display is performed in the second embodiment. The arrangement of the CF liquid crystal panel 50, the PDLC panel 60, the first light guide plate 83a, and the light-guide plate light source unit 81 according to the present embodiment is similar to that according to the second embodiment. Further, the arrangement of the first PDLC light source unit 70a according to the present embodiment is similar to that according to the first embodiment. In the present embodiment, the first PDLC light source unit 70a and the light-guide plate light source unit 81 constitute the light source unit 100. The first PDLC light source unit 70a and the light-guide plate light source unit 81 are synchronously driven by the light source drive circuit 40.

Figure 25:
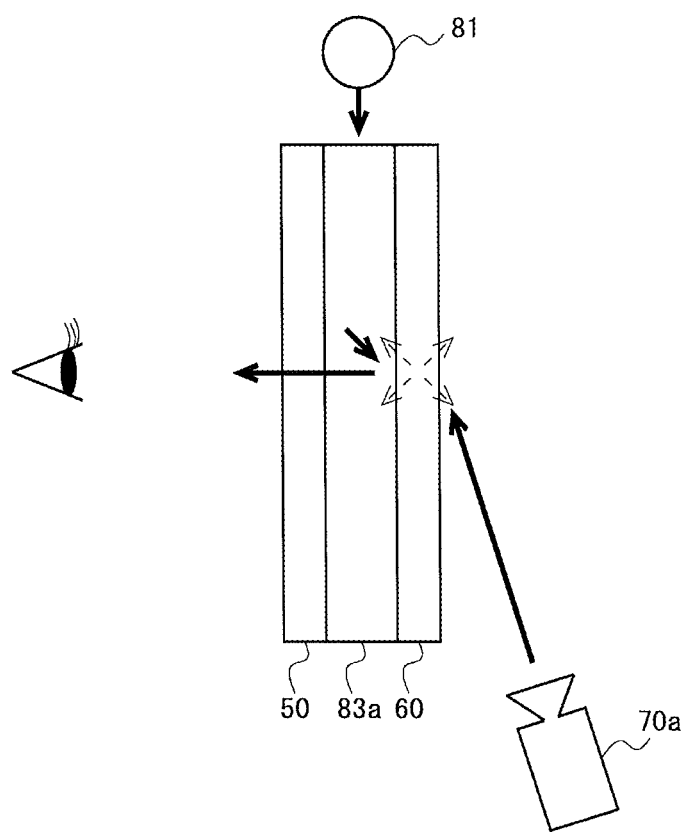
FIG. 25 is a sectional view of one pixel component of the CF liquid crystal panel, the PDLC panel, and the first light guide plate shown in FIG. 24.

FIG. 25 is a sectional view of one pixel component of the CF liquid crystal panel 50, the PDLC panel 60, and the first light guide plate 83a shown in FIG. 24. The first PDLC light source unit 70a according to the present embodiment applies the light source light to the rear surface of the PDLC panel 60. More specifically, at the image displaying time or at the partially non-displaying time, the first PDLC light source unit 70a applies the light source light to the PDLC display element 61 in the separation area in which image display is performed, from the rear surface. Therefore, according to the present embodiment, the front direction vertical component of the spread light source light of the first PDLC light source unit 70a is added to the light in the second embodiment, which is to be applied to the CF liquid crystal display element 51 in the separation area in which image display is performed. It should be noted that other basic configurations and operations are similar to those in the first embodiment or the second embodiment, and therefore, their description will be omitted.

3.2 Effects

According to the present embodiment, by also using the first PDLC light source unit 70a in the configuration of the second embodiment, the front direction vertical component of the spread light source light of the first PDLC light source unit 70a is added to the light applied to the CF liquid crystal display element 51 in the separation area in which image display is performed. Therefore, luminance of display image can be improved.

3.3 First Modification

Figure 26:
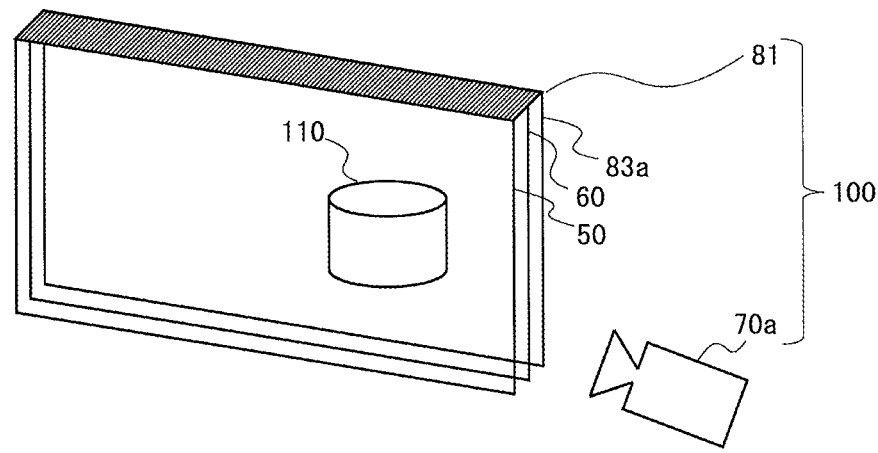
FIG. 26 is an oblique perspective view for explaining the arrangement of a CF liquid crystal panel, a PDLC panel, a PDLC light source unit, and a first light guide plate according to a first modification of the third embodiment.

FIG. 26 is an oblique perspective view for explaining the arrangement of the CF liquid crystal panel 50, the PDLC panel 60, the first PDLC light source unit 70a, and the first light guide plate 83a according to the first modification of the third embodiment. In the present modification, the first PDLC light source unit 70a in the first embodiment is also used in order to improve luminance of a part in which the image display is performed, in the first modification of the second embodiment. The arrangement of the CF liquid crystal panel 50, the PDLC panel 60, the first light guide plate 83a, and the light-guide plate light source unit 81 in the present modification is similar to that in the first modification of the second embodiment.

Figure 27:
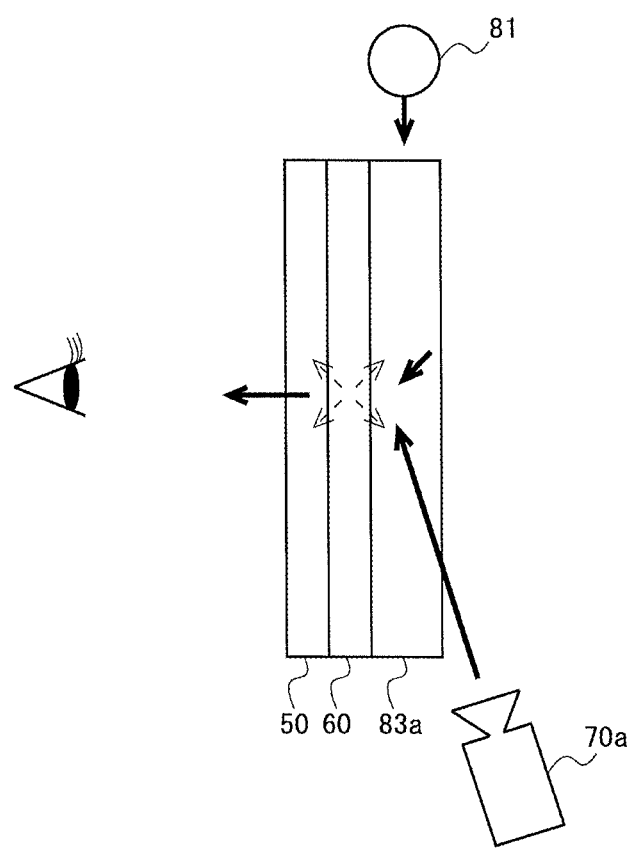
FIG. 27 is a sectional view of one pixel component of the CF liquid crystal panel, the PDLC panel, and the first light guide plate shown in FIG. 26.

FIG. 27 is a sectional view of one pixel component of the CF liquid crystal panel 50, the PDLC panel 60, and the first light guide plate 83a shown in FIG. 26. The first PDLC light source unit 70a according to the present modification applies the light source light to the rear surface of the PDLC panel 60. It should be noted that the light source light of the first PDLC light source unit 70a may be applied to the rear surface of the PDLC panel 60 via the first light guide plate 83a, or may be directly applied to the rear surface of the PDLC panel 60 by providing an air layer and the like between the first light guide plate 83a and the PDLC panel 60. More specifically, at the image displaying time or at the partially non-displaying time, the first PDLC light source unit 70a applies the light source light to the PDLC display element 61 in the separation area in which image display is performed, from the rear surface. Therefore, according to the present modification, the front direction vertical component of the spread light source light of the first PDLC light source unit 70a is added to the light in the first modification of the second embodiment, which is to be applied to the CF liquid crystal display element 51 in the separation area in which image display is performed. It should be noted that other basic configurations and operations are similar to those according to the first embodiment or the first modification of the second embodiment, and therefore, their description will be omitted.

According to the present modification, by also using the first PDLC light source unit 70a in the configuration of the first modification of the second embodiment, the front direction vertical component of the spread light source light of the first PDLC light source unit 70a is added to the light applied to the CF liquid crystal display element 51 in the separation area in which image display is performed. Therefore, luminance of display image can be improved.

3.4 Second Modification

Figure 28:
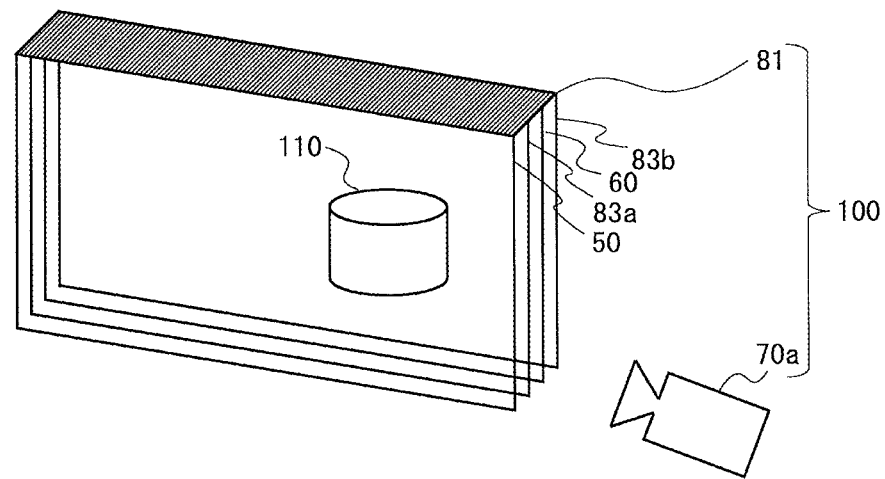
FIG. 28 is an oblique perspective view for explaining the arrangement of a CF liquid crystal panel, a PDLC panel, a PDLC light source unit, and a first and second light guide plates according to a second modification of the third embodiment.

FIG. 28 is an oblique perspective view for explaining the arrangement of the CF liquid crystal panel 50, the PDLC panel 60, the first PDLC light source unit 70a, and the first and second light guide plates 83a and 83b according to the second modification of the third embodiment. In the present modification, the first PDLC light source unit 70a in the first embodiment is also used in order to improve luminance of a part in which the image display is performed, in the second modification of the second embodiment. The arrangement of the CF liquid crystal panel 50, the PDLC panel 60, and the first and second light guide plates 83a and 83b, and the arrangement of the light-guide plate light source unit 81, in the present modification, are similar to those in the second modification of the second embodiment.

Figure 29:
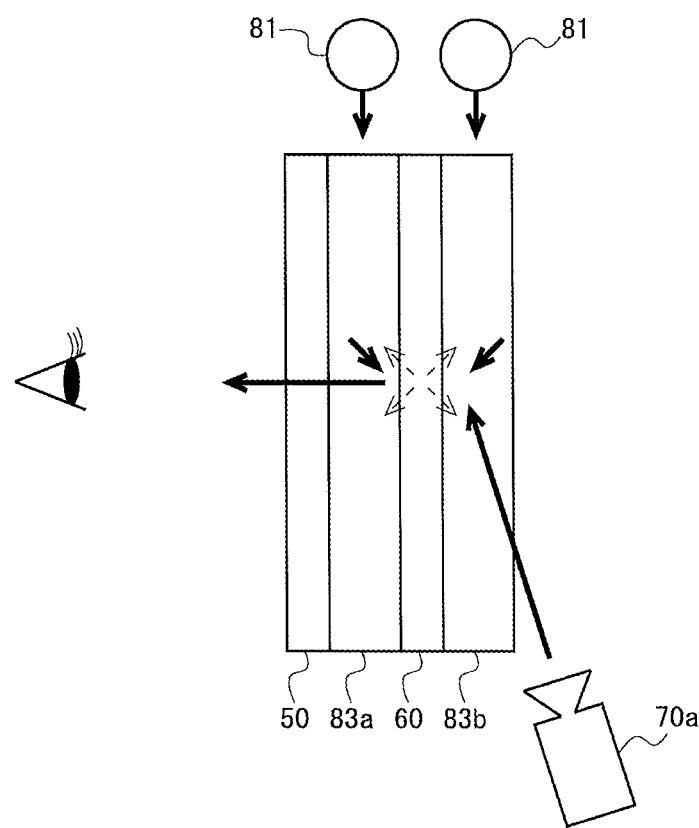
FIG. 29 is a sectional view of one pixel component of the CF liquid crystal panel, the PDLC panel, and the first and second light guide plates shown in FIG. 28.
Figure 30:
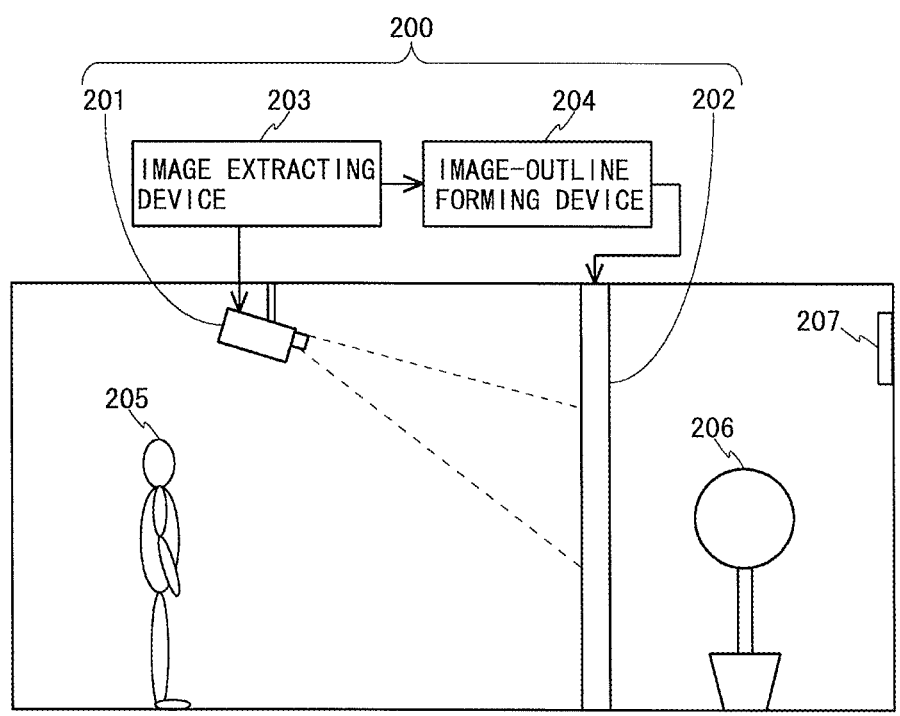
FIG. 30 is a view showing a configuration of the presence display device disclosed in Japanese Patent Application Laid-Open No. H5-191726.

FIG. 29 is a sectional view of one pixel component of the CF liquid crystal panel 50, the PDLC panel 60, and the first and second light guide plates 83a and 83b shown in FIG. 28. The first PDLC light source unit 70a according to the present modification applies the light source light to the rear surface of the PDLC panel 60. It should be noted that the light source light of the first PDLC light source unit 70a may be applied to the rear surface of the PDLC panel 60 via the second light guide plate 83b, or may be directly applied to the rear surface of the PDLC panel by providing an air layer and the like between the second light guide plate 83b and the PDLC panel 60. More specifically, at the image displaying time or at the partially non-displaying time, the first PDLC light source unit 70a applies the light source light to the PDLC display element 61 in the separation area in which image display is performed, from the rear surface. Therefore, according to the present modification, the front direction vertical component of the spread light source light of the first PDLC light source unit 70a is added to the light in the second modification of the second embodiment, which is to be applied to the CF liquid crystal display element 51 in the separation area in which image display is performed. It should be noted that other basic configurations and operations are similar to those of the first embodiment or the second modification of the second embodiment, and therefore, their description will be omitted.

According to the present modification, by also using the first PDLC light source unit 70a in the configuration of the second modification of the second embodiment, the front direction vertical component of the spread light source light of the first PDLC light source unit 70a is added to the light applied to the CF liquid crystal display element 51 in the separation area in which image display is performed. Therefore, luminance of display image can be improved.

4. Others

The present invention is not limited to the above embodiments, and can be implemented by various modifications within the range not deviating from the gist of the present invention. For example, in place of the CF liquid crystal panel 50, there may be employed other display devices capable of switching between color transmittance display and shield display. As other display devices capable of switching between color transmittance display and shield display, there are a display device utilizing the principle of electrowetting, a display device utilizing an electrochromic compound, a display device utilizing an electronic migrating body, a display device utilizing a DMD (Digital Micromirror Device), and a display device utilizing a microshutter, for example. It should be noted that, in the other display devices, other than the CF liquid crystal panel 50, capable of switching between color transmittance display and shield display, "shield display" includes the case of spreading light to only the light source side (the light guide plate side in the case of using the light guide plate).

In place of the PDLC panel 60, there may be employed other display devices capable of switching between transmittance display and spread display. As other display devices capable of switching between transmittance display and spread display, there are a display device utilizing the principle of electrowetting, a display device utilizing an electrochromic compound, a display device utilizing an electronic migrating body, a display device utilizing a DMD, and a display device utilizing a microshutter, for example. It should be noted that, in the other display devices, other than the PDLC panel 60, capable of switching between transmittance display and spread display, "spread display" includes the case of spreading light to only the side to which light to be applied (including the background light) reaches.

In the first embodiment and the first modification thereof, it has been described that the timing assignment control unit 13 gives the CF liquid crystal timing assignment signal CT, the PDLC timing assignment signal PT, and the light source timing assignment signal LT generated based on the drive timing control signal DT, to respectively the CF liquid crystal display element signal control unit 14, the PDLC display element signal control unit 15, and the light source signal control unit 16. However, the present invention is not limited to this. The image control unit 12 may give the drive timing control signal DT to the CF liquid crystal display element signal control unit 14, the PDLC display element signal control unit 15, and the light source signal control unit 16, without providing the timing assignment control unit 13.

In the first and third embodiments and the modifications thereof, in order to improve utilization efficiency of the light source light of the first and second PDLC light source units 70a and 70b, there may be employed a mechanism for spreading the light source light (such as a box having each panel arranged on the front surface and the rear surface, and having the display item 110 arranged in the inside).

In the second and third embodiments, it has been described that area active drive is performed by using a light guide plate which is formed into blocks. However, the present invention is not limited to this. A normal light guide plate which is not formed into blocks as shown in FIG. 16 may be used. In this case, in order to allow the background to be more clearly transmitted at the time of setting the part in which image display is not performed to the transmittance state, it is desirable to use a light guide plate with small front emission light source light and in high transmission factor.

In the third embodiment and each modification thereof, the first PDLC light source unit 70a may be arranged to apply the light source light to the front surface of the PDLC panel 60, in a similar manner to that of the third modification of the first embodiment. In the third embodiment and each modification thereof, the light source light may be applied to the front surface and the rear surface of the PDLC panel 60, by using the first and second PDLC light source units 70a and 70b, in a similar manner to that of the fourth modification of the first embodiment. Accordingly, luminance of the display image can be improved.

In each of the above embodiments and the modification thereof, the configuration may be such that two CF liquid crystal panels 50 are used, and the two CF liquid crystal panels 50 sandwich the PDLC panel 60 (and the first light guide plate 83a and the like). Accordingly, in the first embodiment and the third and fourth modifications thereof, it is possible to perform image display by the CF liquid crystal panel arranged at the front surface side (hereinafter, referred to as a "front CF liquid crystal panel"). Also, by utilizing a component toward a CF liquid crystal panel 50 side (hereinafter, referred to as a "rear direction vertical component") arranged at the rear surface side (hereinafter, referred to as a "rear CF liquid crystal panel") out of the spread light source light of the first PDLC light source unit 70a (further, the second PDLC light source unit 70b, in the fourth modification), it is possible to perform image display also by the rear CF liquid crystal panel. In the second embodiment, it is possible to perform image display by the front CF liquid crystal panel, and also perform image display by the rear CF liquid crystal panel by utilizing the rear direction vertical component of the spread rear emission light source light of the first light guide plate 83a. In the first modification of the second embodiment, it is possible to perform image display by the front CF liquid crystal panel, and also perform image display by the rear CF liquid crystal panel by utilizing the rear emission light source light of the first light guide plate 83a and the rear direction vertical component of the spread front emission light source light of the first light guide plate 83a. In the second modification of the second embodiment, it is possible to perform image display by the front CF liquid crystal panel, and also perform image display by the rear CF liquid crystal panel by utilizing the rear emission light source light of the second light guide plate 83b and the rear direction vertical component of the spread front emission light source light of the second light guide plate 83b. In the third embodiment, it is possible to perform image display by the front CF liquid crystal panel, and also perform image display by the rear CF liquid crystal panel by utilizing the rear direction vertical component of the spread rear emission light source light of the first light guide plate 83a and the rear direction vertical component of the spread light source light of the first PDLC light source unit 70a. In the first modification of the third embodiment, it is possible to perform image display by the front CF liquid crystal panel, and also perform image display by the rear CF liquid crystal panel by utilizing the rear emission light source light of the first light guide plate 83a, the rear direction vertical component of the spread front emission light source light of the first light guide plate 83a, and the rear direction vertical component of the spread light source light of the first PDLC light source unit 70a. In the second modification of the third embodiment, it is possible to perform image display by the front CF liquid crystal panel, and also perform image display by the rear CF liquid crystal panel by utilizing the rear emission light source light of the second light guide plate 83b, the rear direction vertical component of the spread front emission light source light of the second light guide plate 83b, and the rear direction vertical component of the spread light source light of the first PDLC light source unit 70a.

It should be noted that, in the case of using the front CF liquid crystal panel and the rear CF liquid crystal panel, it is desirable that the image display positions are coincident with each other between the front CF liquid crystal panel and the rear CF liquid crystal panel. However, the present invention is not limited to this. The image displayed in the rear CF liquid crystal panel is, for example, the image reversed (left and right reversed, in each of the above embodiment and the modification thereof) from the image displayed in the front CF liquid crystal panel when seen from one of the front surface side and the rear surface side. However, the present invention is not limited to this. It should be noted that, in the presence display device 200 disclosed in Japanese Patent Application Laid-Open No. H5-191726, although an image can be displayed on the surface of the transmission factor control screen 202 at the opposite side of the projector 201, there is displayed the image that is obtained by reversing an image seen from the surface of the transmission factor control screen 202 at the projector 201 side. That is, according to the presence display device 200, it is difficult to perform appropriate image display to observers positioned respectively at both sides sandwiching the panel (the screen) contributing to image display. On the other hand, in the case of using the front CF liquid crystal panel and the rear CF liquid crystal panel in each of the above embodiments and the modifications thereof, images are independently formed by the front CF liquid crystal panel and the rear CF liquid crystal panel. Accordingly, it is possible to perform appropriate image display to observers positioned respectively at both sides sandwiching the front CF liquid crystal panel, the rear CF liquid crystal panel, and the PDLC panel 60 as panels contributing to image display.

DESCRIPTION OF REFERENCE CHARACTERS

1: IMAGE DISPLAY DEVICE
10: SIGNAL PROCESSING CIRCUIT (SIGNAL PROCESSING UNIT)
11: SIGNAL SEPARATION CONTROL UNIT
12: IMAGE CONTROL UNIT
13: TIMING ASSIGNMENT CONTROL UNIT

14: CF LIQUID CRYSTAL DISPLAY ELEMENT SIGNAL CONTROL UNIT (FIRST DISPLAY CONTROL UNIT)
15: PDLC DISPLAY ELEMENT SIGNAL CONTROL UNIT (SECOND DISPLAY CONTROL UNIT)
16: LIGHT SOURCE SIGNAL CONTROL UNIT (LIGHT SOURCE CONTROL UNIT)
17: DISPLAY-IMAGE POSITION DETECTING UNIT
18: MEMORY
20: CF LIQUID CRYSTAL DISPLAY ELEMENT DRIVE CIRCUIT (FIRST DISPLAY DRIVE UNIT)
30: PDLC DISPLAY ELEMENT DRIVE CIRCUIT (SECOND DISPLAY DRIVE UNIT)
40: LIGHT SOURCE DRIVE CIRCUIT (LIGHT SOURCE DRIVE UNIT)
50: CF LIQUID CRYSTAL PANEL (FIRST DISPLAY PANEL)
51: CF LIQUID CRYSTAL DISPLAY ELEMENT (FIRST DISPLAY ELEMENT)
52: CF
60: PDLC PANEL (SECOND DISPLAY PANEL)
61: PDLC DISPLAY ELEMENT (SECOND DISPLAY ELEMENT)
71, 82: LIGHT SOURCE
71r, 71g, 71b: LIGHT EMITTING ELEMENTS HAVING RED COLOR, GREEN COLOR, AND BLUE COLOR
82r, 82g, 82b: LIGHT EMITTING ELEMENTS HAVING RED COLOR, GREEN COLOR, AND BLUE COLOR
80: BACKLIGHT UNIT
81: LIGHT-GUIDE PLATE LIGHT SOURCE UNIT
83a, 83b: FIRST AND SECOND LIGHT GUIDE PLATES
90: LIGHT IRRADIATING UNIT
100: LIGHT SOURCE UNIT
IN: INPUT SIGNAL
ID: IMAGE DATA
Da: DISPLAY-IMAGE POSITION ASSIGNING DATA
CD: CF LIQUID CRYSTAL DATA (FIRST DISPLAY DATA)
PD: PDLC DATA (SECOND DISPLAY DATA)
LD: LIGHT SOURCE DATA
DT: DRIVE TIMING CONTROL SIGNAL

The invention claimed is:

1. An image display device that displays a color image, comprising:
a first display panel comprising a plurality of first display elements arranged in a matrix shape, to transmit incident light as color light; and
a light irradiating unit to apply light to the first display panel, wherein the light irradiating unit comprises:
a light source unit; and
a second display panel capable of switching between a spreading state of spreading incident light and a transmittance state of allowing incident light to be transmitted,
wherein the second display panel is configured to switch to the spreading state at a time when the color image is to be displayed, to spread light emitted by the light source unit,
wherein the first display panel is configured to display the color image by controlling a transmission factor of light spread by the second display panel, and
wherein the second display panel comprises a plurality of second display elements each capable of switching between the spreading state and the transmittance state.

2. The image display device according to claim 1, wherein the light source unit comprises a first second-display panel light source unit to apply light to the second display panel.

3. The image display device according to claim 2, wherein the first second-display panel light source unit is configured to apply light to one main surface of the second display panel.

4. The image display device according to claim 3, wherein
the light source unit further comprises a second second-display panel light source unit to apply light to the second display panel, and
the first second-display panel light source unit and the second second-display panel light source unit are configured to apply light to both main surfaces of the second display panel, respectively.

5. The image display device according to claim 2, wherein the first second-display panel light source unit has directivity at a level at which light is applicable to a part of the second display panel.

6. The image display device according to claim 1, wherein
the light irradiating unit further comprises a first light guide plate that guides incident light, and
the light source unit comprises a light-guide plate light source unit to apply light to the first light guide plate.

7. The image display device according to claim 6, wherein from a side of the first display panel, the first light guide plate and the second display panel are sequentially arranged.

8. The image display device according to claim 6, wherein from a side of the first display panel, the second display panel and the first light guide plate are sequentially arranged.

9. The image display device according to claim 6, wherein
the light irradiating unit further comprises a second light guide plate to guide incident light,
the light-guide plate light source unit is configured to apply light to the first light guide plate and the second light guide plate, and
from a side of the first display panel, the first light guide plate, the second display panel, and the second light guide plate are sequentially arranged.

10. The image display device according to claim 6, wherein
the first light guide plate is formed into a plurality of blocks, and
the light-guide plate light source unit is configured to apply light to each block.

11. The image display device according to claim 1, wherein
each of the second display elements corresponds to any of the plurality of first display elements, and each is configured to switch to a spreading state synchronously with a corresponding first display element, at a time when the color image is to be displayed.

12. The image display device according to claim 1, further comprising:
a first display drive unit to drive the first display panel;
a second display drive unit to drive the second display panel;
a light source drive unit to drive the light source unit; and
a signal processing unit to control the first display drive unit, the second display drive unit, and the light source drive unit, respectively, based on an input signal given from an outside.

13. The image display device according to claim 12, wherein
the signal processing unit comprises:
an image control unit to generate first display data for controlling the first display drive unit, second display data for controlling the second display drive unit, and light source data for controlling the light source drive unit, based on image data for displaying the color image and display-image position assigning data for assigning a display position of the color image, each of which is obtained based on the input signal;

a first display control unit to control the first display drive unit based on the first display data;

a second display control unit to control the second display drive unit based on the second display data; and a light source control unit to control the light source drive unit based on the light source data.

14. The image display device according to claim 13 wherein the input signal comprises the image data and the display-image position assigning data, and the signal processing unit further comprises a signal separation control unit to separate the input signal into the image data and the display-image position assigning data, and to give the image data and the display-image position assigning data to the image control unit.

15. The image display device according to claim 13 wherein the input signal comprises the image data, and the signal processing unit further comprises a display-image position detecting unit to generate the display-image position assigning data based on the image data which the input signal comprises, and to give the image data and the display-image position assigning data to the image control unit.

16. The image display device according to claim 12, wherein the signal processing unit is configured to separate one frame period of the input signal into a plurality of sub-frame periods, and interpolate, in the sub-frame periods, images to be displayed in each of continuous frame periods.

17. A drive method for an image display device including a first display panel including a plurality of first display elements arranged in a matrix shape and capable of transmitting incident light as color light, and a light irradiating unit to apply light to the first display panel and also including a second display panel to display a color image, the drive method comprising:

switching a state of the second display panel between a spreading state of spreading incident light and a transmittance state of allowing incident light to be transmitted; and making the color image displayed in the first display panel by controlling a transmission factor of light spread by the second display panel, wherein the light irradiating unit further includes a light source unit, wherein switching of the state of the second display panel includes switching the state of the second display panel to the spreading state at a time when the color image is to be displayed, and spreading light emitted by the light source unit, and wherein the second display panel includes a plurality of second display elements each capable of switching between the spreading state and the transmittance state.

* * * * *